(12) United States Patent
Gopisetti et al.

(10) Patent No.: US 11,853,773 B2
(45) Date of Patent: Dec. 26, 2023

(54) INTERACTIVE PROFILE-BASED SELF-LEARNING APPLICATION FOR SMART FIELD DEVICES

(71) Applicant: Honeywell International, Inc., Morris Plains, NJ (US)

(72) Inventors: Santosh Gopisetti, Hyderabad (IN); Sharath Babu Malve, Telangana (IN); Siva Sagar Kuricheti, Telangana (IN); Chandrasekar Reddy Mudireddy, Telangana (IN)

(73) Assignee: Honeywell International, Inc., Charlotte, NC (US)

( * ) Notice: Subject to any disclaimer, the term of this patent is extended or adjusted under 35 U.S.C. 154(b) by 798 days.

(21) Appl. No.: 16/405,395

(22) Filed: May 7, 2019

(65) Prior Publication Data

US 2020/0356379 A1 Nov. 12, 2020

(51) Int. Cl.
*G06F 1/24* (2006.01)
*G06F 9/00* (2006.01)
*G06F 9/445* (2018.01)
*G06N 3/08* (2023.01)
*G06F 9/4401* (2018.01)

(52) U.S. Cl.
CPC .......... *G06F 9/4451* (2013.01); *G06F 9/4415* (2013.01); *G06N 3/08* (2013.01)

(58) Field of Classification Search
CPC ....... G06F 9/4451; G06F 9/4415; G06N 3/08; H04L 67/303; H04L 67/125; H04L 67/306; G05B 19/042
See application file for complete search history.

(56) References Cited

U.S. PATENT DOCUMENTS

| | | | | |
|---|---|---|---|---|
| 10,185,308 B2* | 1/2019 | Panther | ............... | G05B 19/0423 |
| 2009/0271726 A1* | 10/2009 | Gavimath | ............. | H04L 67/125 |
| | | | | 715/771 |
| 2012/0041744 A1* | 2/2012 | Kantzes | ............... | G05B 19/409 |
| | | | | 703/13 |
| 2012/0166609 A1* | 6/2012 | Lux | ....................... | G05B 19/042 |
| | | | | 709/223 |
| 2015/0018996 A1* | 1/2015 | Furihata | ............... | G05B 19/418 |
| | | | | 700/108 |
| 2016/0124423 A1* | 5/2016 | Wagener | ................. | G05B 19/05 |
| | | | | 700/19 |
| 2016/0291563 A1* | 10/2016 | Kumar | .................. | H04L 67/125 |
| 2018/0181924 A1* | 6/2018 | Yokochi | .................. | G06Q 10/20 |
| 2019/0113898 A1* | 4/2019 | Mori | .................... | G05B 19/042 |

* cited by examiner

*Primary Examiner* — Xuxing Chen
(74) *Attorney, Agent, or Firm* — Paschall & Associates, LLC; James C. Paschall

(57) ABSTRACT

Aspects of the disclosure relate to computer hardware and software for managing a field device (e.g., a transmitter, an actuator, a valve, a switch, a sensor, a power supply, a meter, or the like) used in one or more pieces of equipment that process one or more input chemicals to create one or more products in a chemical plant, a petrochemical plant, a refinery, or the like) by using an interactive automation/self-learning program module installed in a computing device (e.g., a mobile device). Some aspects of the disclosure provide techniques that may enable a computing device to connect to a field device; automatically identify the field device; provide guidance to manage the connected field device; receive input corresponding to the guidance; and/or manage the field device based on the input.

19 Claims, 20 Drawing Sheets

Hi... Welcome to Smart Configurator...!
A Smart Assistant tool......!

FIG. 5A

Hi... Welcome to Smart Configurator...!
A Smart Assistant tool......!

Scanning....

FIG. 5B

Hi... Welcome to Smart Configurator...!
A Smart Assistant tool......!

Scanning....

Connected Device is SMARTLINE
Temperature Transmitter STT700 REV 1

What would you Like to Do?

Configure Device

View Device Diagnostics

Calibrate the Device

FIG. 5C

Select Sensor 2 Input Type

| RTD |
| Thermocouple |
| Milli Volt |
| OHM |

Sensor 2 Input Type configured as RTD

Configure Engineering Unit from below available Units

| Deg C |
| Deg F |
| Deg R |
| Deg K |

Configured Unit is Deg C

FIG. 5E

Configure the Range of the Transmitter

Default Range of configured RTD Sensor is
- 200 Deg C to 850 Deg C

Do you want to re-range the Transmitter?

| Re-range the Device |
|---|

| Keep Default Range |
|---|

Enter Low Range Value of Transmitter
0
_____

Enter High Range Value of Transmitter
200
_____

FIG. 5F

Parameter Download is in progress.....

FIG. 5I

Parameter Download is in progress......

Greetings !!!!!!.

Device is configured successfully.

Transmitter is ready to Use!!!!!

Thanks for Using Smart Assistant Tool.

FIG. 5J

INTERACTIVE PROFILE-BASED SELF-LEARNING APPLICATION FOR SMART FIELD DEVICES

FIELD

Aspects of the disclosure relate to computer hardware and software. In particular, one or more aspects of the disclosure generally relate to computer hardware and software for managing (e.g., configuring, calibrating, diagnosing, monitoring, etc.) a field device (e.g., a valve, an actuator, a transmitter, etc.).

BACKGROUND

A user (e.g., a field engineer) may manage a field device by using a complex handheld tool. For example, when the user uses the handheld tool to manage the field device, the user is generally required to have high familiarity with the field device such that the user can select or input a correct device version (or device description version or device type manager) for the field device, and the user is generally required to traverse between different configuration menus to identify and manage the field device. Thus, there is an ever-present need to develop systems, apparatuses, and methods to simplify and expedite management process of a field device.

SUMMARY

The following summary presents a simplified summary of certain features. The summary is not an extensive overview and is not intended to identify key or critical elements.

Systems, apparatuses, and methods are described for providing effective, efficient and convenient ways to manage field devices. One or more aspects of the disclosure generally relate to computer hardware and software for managing a field device by using an interactive profile-based self-learning program module installed in a computing device (e.g., a mobile device). Some aspects of the disclosure provide techniques that may enable a computing device to connect to a field device; automatically identify the field device; automatically or in response to a user's request for assistance, provide options, recommendations, inquires, and/or predictions to guide the user to manage the connected field device; receive user inputs corresponding to the options, recommendations, inquires, and/or predictions; and/or manage the field device based on the user inputs. The computing device may provide the options, recommendations, inquires, and/or predictions based on one or more of device information of the field device, user information of the user, management history of the field device, or management history of the user. The computing device may automatically determine that the user inputs include error(s), generate alerts corresponding to the error(s), and/or provide recommendation(s) to correct the error(s). As such, when managing a field device, the user does not need to use a complex handheld device, does not need to have high familiarity with the field device, and does not need to traverse between different configuration menus to identify and manage the field device. Thus, the management process of a field device may be simplified and the complexity of the management process may be reduced.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5J depict illustrative graphical user interfaces for managing a field device using a computing device, on which the interactive profile-based self-learning program module is installed, in accordance with one or more example embodiments;

DETAILED DESCRIPTION

Figure 1A:
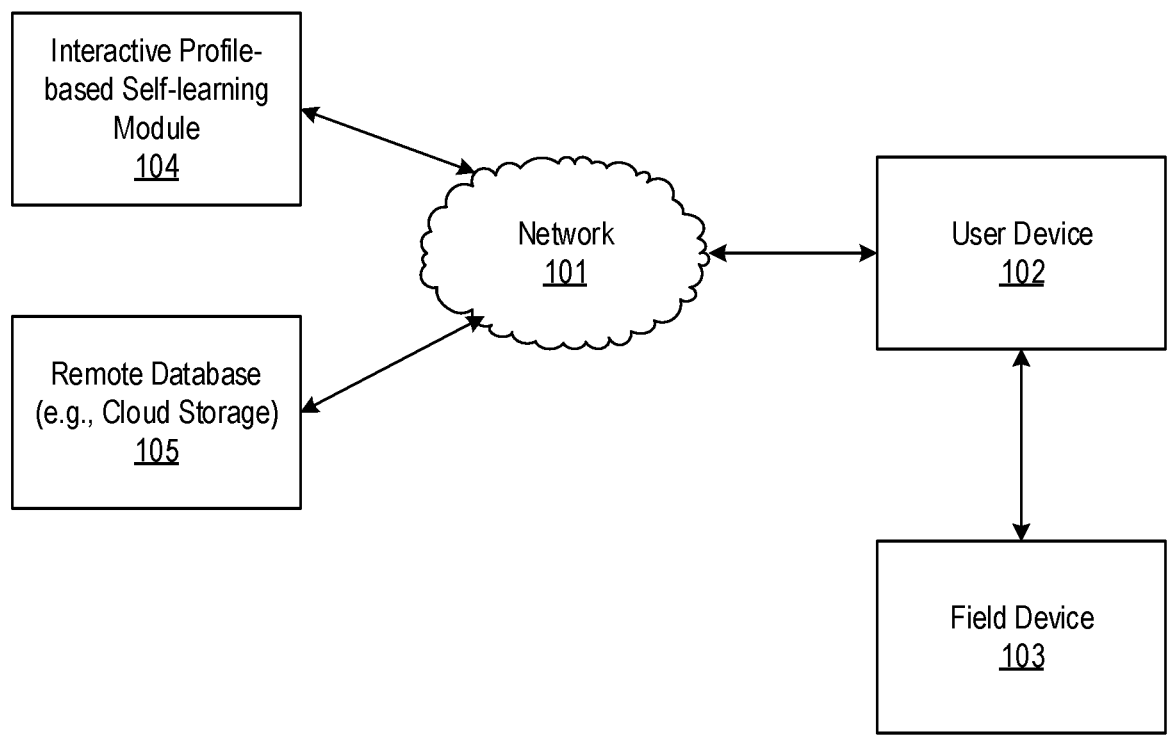
FIGS. 1A-1B depict an illustrative computing environment for managing a field device using a computing device, on which the interactive profile-based self-learning program module is installed, in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A user may manage a field device installed in a plant using a complex handheld tool. To manage the field device using the handheld tool, the user is required to have extensive knowledge of this particular field device such that the user can select or input a compatible device version or device description version for the field device. The user needs to traverse between different configuration menus to identify and manage the field device. Also, the user needs to wait until an actual management attempt fails to know the reasons of the management failure. For example, before the user can configure a temperature transmitter using a handheld tool, the user needs to manually open a device information menu and enter the device profile (e.g., device tag name, device serial number, device type, device version, device description version, manufacturer, and/or other related device information) in the device information menu. The user then needs to manually switch from the device information menu to a device description menu, and enter or select a compatible device version (e.g., a compatible device firmware version) and/or a compatible device description (a compatible description describing, e.g., commands and display formats with which a management device can perform management on the field device) version. The user further needs to manually switch to a parameter setting menu, select, from a plurality of variables, one or more device variables (e.g., temperature sensor type, temperature ranges) that are applicable to the temperature transmitter, determine proper values for the one or more variables, and input the values in the parameter setting menu. The handheld tool may attempt to configure the temperature transmitter by sending variable values to the temperature transmitter and instructing the temperature transmitter to download the variable values. Sometimes, the configuration may fail because the user entered incorrect variable values. The user would not know he entered incorrect variable values until the users sees a configuration failure message displayed on the screen of the handheld tool. Thus, there is an ever-present need to develop systems, apparatuses, and methods to simplify and expedite management process of a field device.

The following disclosure proposes a way to provide effective, efficient, and convenient ways to manage field devices by using an interactive profile-based self-learning program module that may be installed in a computing device (e.g., a mobile device). The computing device, on which the interactive profile-based self-learning program module described herein is installed, may be used to replace the complex handheld tool. The computing device, on which the interactive profile-based self-learning program module described herein is installed, may automatically identify a field device; automatically, or in response to a user's request for assistance, provide management options, recommendations, inquires, and/or predictions to guide the user of the computing device to manage the connected field device; and automatically predict management failures before an actual management attempt is executed and/or provide correction recommendations to avoid management failures. The computing device may provide the management options, recommendations, inquires, and/or predictions based on one or more of information of the field device, information of the user, management history of the field device, or management history of the user. As such, the management process of a field device may be simplified and the complexity of the management process may be reduced.

These features will be further described with reference to FIGS. 1A-5J, described below.

Figure 1B:
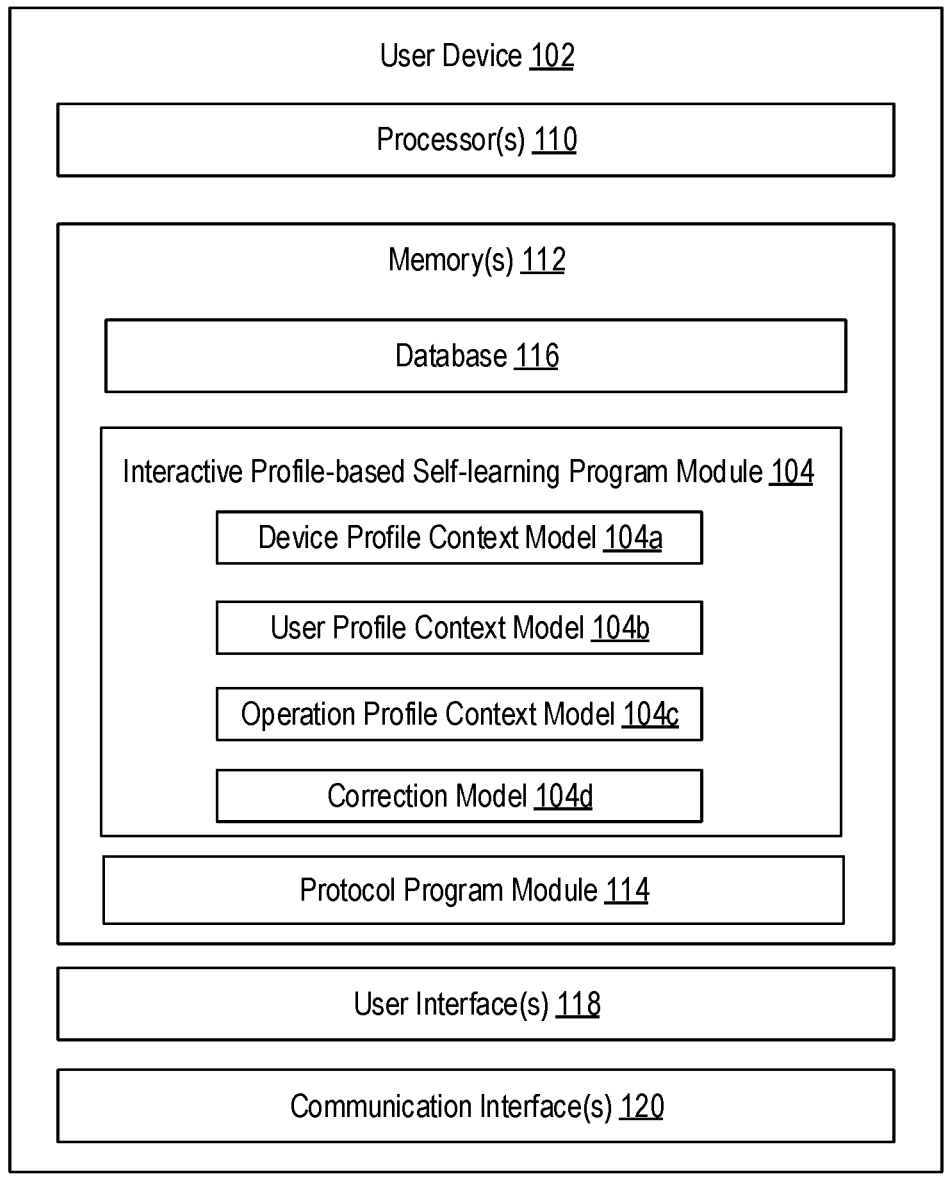

FIGS. 1A-1B depict an illustrative computing environment for managing a field device using a computing device, on which the interactive profile-based self-learning program module is installed, in accordance with one or more example embodiments. Referring to FIG. 1A, a computing environment 100 may include one or more computing devices and/or elements. For example, the computing environment 100 may include a network 101, a user device 102, a field device 103, an interactive profile-based self-learning program module 104, and a remote database 105.

The network 101 may be a wired or wireless communication network. The network 101 may interconnect other computing devices and/or elements, and may allow the other computing devices and/or elements to communicate with each other and exchange data and/or signals with each other. For example, the network 101 may comprise an Ethernet network that uses Ethernet cables to transfer data, or the like. As an example, the network 101 may comprise a local area network (LAN), a wide area network (WAN), or the like.

The field device 103 may be any field device (e.g., a transmitter, an actuator, a valve, a switch, a sensor, a power supply, a meter, or the like) used in one or more pieces of equipment that process one or more input chemicals to create one or more products in a chemical plant, a petrochemical plant, a refinery, or the like. The field device 103 may be used to control, monitor, execute, and/or maintain one or more processes that are operated by the one or more pieces of equipment. For example, the field device 103 may be a smart temperature transmitter that includes a temperature sensor measuring a temperature of a reactor in a chemical plant. The field device 103 may comprise processors (e.g., a microprocessor), memories (e.g., one or more of non-transitory storage medium or non-volatile memory), and communication interfaces (e.g., a 4-20 mA current loop, a digital bus). The field device 103 may communicate with an external device (e.g., the user device 102, or the like) via the communication interfaces. The memories of the field device 103 may include one or more program modules having instructions that, when executed by the processors, cause the field device 103 to receive commands (e.g., connection commands, management commands, or the like) from the external communication device; take actions (e.g., sending the device profile, sending values of monitored process variables, downloading variable configuration settings, or the like) based on the received commands; send responses (e.g., connection responses, management responses, or the like) to the external device; and/or perform other interactions with the external device.

Figure 2A:
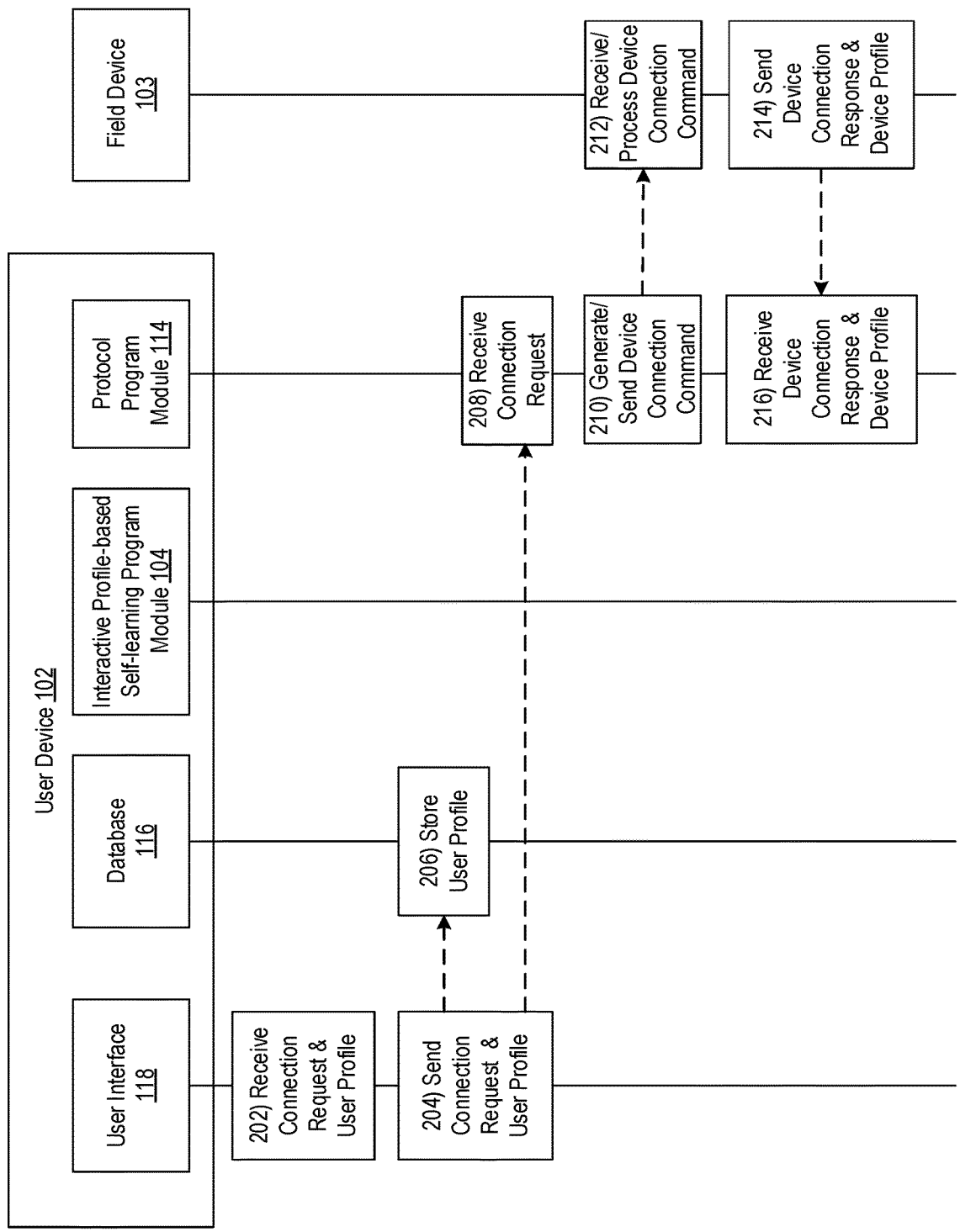
FIGS. 2A-2C depict an illustrative event sequence for managing a field device using a computing device, on which the interactive profile-based self-learning program module is installed, in accordance with one or more example embodiments.
Figure 2B:
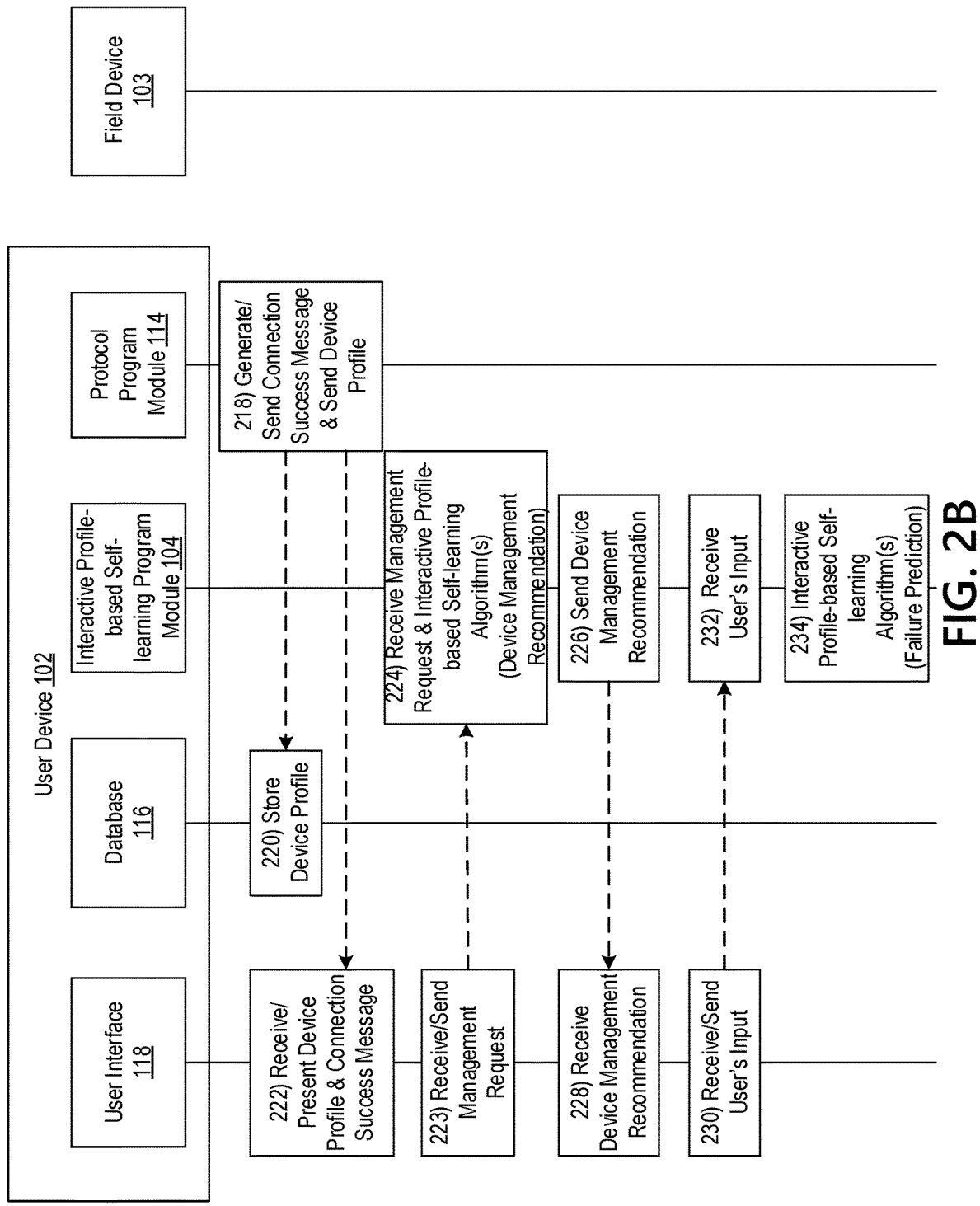

The user device 102 may be a computing device that includes one or more computing devices and/or other computer components (e.g., processors, memories, user interfaces, communication interfaces, which will be further described in FIG. 2B). For example, the user device 102 may comprise one or more of a mobile communication device (e.g., a mobile phone, a portable computing device, or the like), a computer (e.g., a laptop, a desktop, a tablet computer, or the like), one or more embedded devices (e.g., microprocessors, controllers, or the like), etc. The user device 102 may exchange data and/signals with other computing devices and/or elements via the network 101 (e.g., downloading the interactive profile-based self-learning program module 104, sending data associated with the user device to the remote database 105, etc.). The user device 102, on which the interactive profile-based self-learning program module 104 is installed, may connect to the field device 103 via the communication interfaces, automatically identify the device profile of the field device 103, automatically, or in response to a user's request for assistance, provide options, recommendations, inquires, and/or predictions to guide the user to manage the connected field device, send computer-executable management commands to the field device 103 to manage the field device 103, receive management responses from the field device 103, and/or automatically predict management failures before an actual management attempt is executed. The user device 102 may receive user inputs via the user interface. The user device 102 may display, on a screen associated with the user device and via the user interface, graphical and/or text indications of: management options, recommendations, inquires, and/or predictions to guide the user to manage the connected field device 103, management results, error messages, the device profile, and/or any other data associated with management of the field device. The computer-executable management commands may comprise computer-executable management commands that may be understood and executed by the field device 103 so that the field device 103 may take corresponding actions. For example, the computer-executable management commands may comprise one or more of commands to instruct the field device 103 to send current values of one or more device variables or measurement results, commands to instruct the field device 103 to download new and/or updated values of one or more device variables, commands to instruct the field device 103 to perform one or more procedures, commands to instruct to return procedure results, or the like. With these computer-executable management commands, the user device 102 may perform field device management on the field device 103, such as device configuration (e.g., setting variable values for the field device 103), device calibration (e.g., adjusting variable values to meet predetermined standards), device diagnostics (e.g., instructing the field device 103 to execute a predetermined procedure, observing the behavior of the device, identifying device errors based on the behavior), device monitoring (e.g., observing variable values of the field device 103), or the like. While different device management processes may require different management commands, similar management commands may be common among the different device management processes.

The interactive profile-based self-learning program module 104 may be a program module that, when executed by a processor of a computing device (e.g., the user device 102), on which the interactive profile-based self-learning program module 104 is installed, cause the computing device to perform one or more functions to manage the field device. The interactive profile-based self-learning program module 104 may cause the computing device to connect to the field device 103, automatically identify the device profile of the field device 103, automatically, or in response to a user's request for assistance, provide options, recommendations, inquires, and/or predictions to guide the user to manage the connected field device, receive the user inputs, send computer-executable management commands to the field device 103 to manage the field device 103, receive management responses from the field device 103, automatically predict management failures before an actual management attempt is executed, and/or display graphical and/or text indications of: management options, recommendations, inquires, and/or predictions to guide the user to manage the connected field device 103, management results, error messages, the device profile, and/or any other data associated with management of the field device. The interactive profile-based self-learning program module 104 may be initially stored in the remote database 105, and may be available to the user device 102 to access and/or download. For example, the interactive profile-based self-learning program module 104 may be an application stored in an application store and available for the user device 102 to download.

The remote database 105 may comprise one or more databases that are remote from the user device 102 and/or field device 103. For example, the remote database 105 may be a cloud storage. The remote database 105 may store any data (e.g., data associated with the user device 102, the user, the field device 103, etc.), and the user device 102 and/or field device 103 may retrieve or receive data from the remote database 105 and/or store data in the remote database 105.

Referring to FIG. 1B, the user device 102 may include one or more processors 110, one or more memories 112, one or more user interfaces 118, and one or more communication interfaces 120. A data bus (not shown) may interconnect one or more processors 110, one or more memories 112, one or more user interfaces 118, and one or more communication interfaces 120. The user interface 118 may comprise one or more interactive user interfaces that receive the user inputs and present data/information to the user. The communication interface 120 may be a network interface (e.g., BLUETOOTH, WIFI, near-field communication (NFC)) configured to establish communications to the network 101, to the field device 103, and/or to other computing devices and/or elements. The memory 112 may include one or more program modules having instructions that, when executed by the processor 110, cause the user device 102 to perform one or more functions described herein, and the database 116 may comprise one or more databases that store and/or otherwise maintain information that may be used by such program modules and/or processor 110. In some cases, the one or more program modules and/or databases may be stored by and/or maintained in different memory units of the user device 102 and/or by different computing devices that may form and/or otherwise make up the user device 102. As examples of such program modules, the memory 112 may have, store, and/or include a protocol program module 114, an interactive profile-based self-learning module 104, and/or the like. The protocol program module 114 may have instructions that direct and/or cause the user device 102 to support a communication protocol (e.g., Highway Addressable Remote Transducer protocol, Foundation Fieldbus, Profibus, Modbus, Devicenet, Device Language Message Specification, Ethernet/TCPIP) used to establish communications between the user device 102 and the field device 103. By using the communication protocol, the user device 102 may send, via the user communication interface 120, computer-executable requests/commands to the field device 103. The field device 103 may support the communication protocol and may receive the computer-executable requests/commands using the communication protocol. The field device 103 may process the computer-executable requests/commands (e.g., connection commands, management commands, or the like), take actions (e.g., sending the device profile, sending values of monitored process variables, downloading variable configuration settings, or the like) based on the computer-executable requests/commands, and send responses (e.g., connection responses, management responses, or the like) back to the user device 102 by using the communication protocol and via the user communication interface 120.

The interactive profile-based self-learning program module 104 may have instructions that direct and/or cause the user device 102 to automatically identify the device profile of the field device 103, automatically, or in response to a user's request for assistance, provide options, recommendations, inquires, and/or predictions to guide management of the connected field device 103, and/or automatically predict management failures before an actual management attempt is executed, based on one or more interactive profile-based self-learning algorithms. For example, after the user device 102 connects to a field device 103 (e.g., a model A temperature transmitter), the interactive profile-based self-learning program module 104 may direct and/or cause the user device 102 to detect (e.g., based on data, transmitted from the field device 103, indicating its device profile) the device profile of the field device 103, and compare the detected device profile with one or more known device profiles pre-stored in a database. The interactive profile-based self-learning program module 104 may direct and/or cause the user device 102 to determine that the detected device profile matches a pre-stored device profile. As such, the user device 102 may identify the device profile of the field device 103 (e.g., identifying the field device 103 to be a model A temperature transmitter). Based on data associated with the pre-stored matched device profile, the interactive profile-based self-learning program module 104 may direct and/or cause the user device 102 to determine that commands and display formats corresponding to the field device 103 (e.g., model A temperature transmitter) are same as those of the pre-stored matched device profile, and may determine that device variables (e.g., temperature sensor types, temperature ranges) that are supported by the field device 103 are same as those of the pre-stored matched device profile. The user device 102 may receive a request to perform a management process (e.g., configuration) on the field device 103. Based on the determined device variables, commands and display formats, the interactive profile-based self-learning program module 104 may direct and/or cause the user device 102 to provide recommendations on how to configure the field device 103. For example, the user device 102 may display a list of supported temperature input types on a display screen of the user device 102 and ask the user to select a desired temperature input type from the list of supported temperature input types. Based on user input, the user device 102 may further display a list of supported temperature units for the selected temperature input type on the display screen, and ask the user to select a desired temperature unit from the list of supported temperature units. Further, the user device 102 may provide an interactive interface on the display of the user device 102 and ask the user to input a desired temperature operation range for the field device 103. After the user device 102 determines that configuration data (e.g., the selected temperature sensor types, the selected temperature units, the input temperature ranges) is sufficient to configure the field device 103, the user device 102 may generate proper configuration commands (e.g., based on the determined commands and display formats) and send these commands, along with the configuration data, to the field device 103, and instruct the field device 103 to download the configuration data.

As another example, based on a device type of the field device 103, the device profile context model 104a may direct and/or cause the user device 102 to determine that the device type of the field device 103 matches a device type of a previous field device that was previously managed (e.g., configured). Based on management data (e.g., values of device variables used for configuration) associated with the previous field device, the device profile context model 104a may direct and/or cause the user device 102 to present to the user recommendations and inquires to guide management of the field device 103. For example, when the previous field device was configured, a temperature operation range was set as from 0° C. to 200° C. Based on this data, the device profile context model 104a may direct and/or cause the user device 102 to present to the user a recommendation that the user configure the current field device 103 by using the same temperature operation range of 0° C. to 200° C.

As yet another example, based on a user's profile indicating the user's familiarity of the field device 103, the user profile context model 104b may retrieve (automatically or in response to a request received from the user interface) management data indicating how the field device 103 was calibrated in history by other users of same or similar privilege, and guide management of the field device 103 based on one or more variable values of the field device that was previously configured.

As a further example, based on a user's management history that shows the user has performed device calibrations multiple times in row, the interactive profile-based self-learning program module 104 may direct and/or cause the user device 102 to predict that the user may continue to perform calibrations the field device 103. Based on such a prediction, the user device 102 may automatically present to the user a recommendation that the user calibrate the field device 103.

As an additional example, the interactive profile-based self-learning program module 104 may determine if mathematical error(s) would occur based on variable values entered by the user, the interactive profile-based self-learning program module 104 may direct and/or cause the user device 102 to present an error prediction to the user indicating that if the field device 103 uses the variable values entered by the user, an error would occur during the actual configuration attempt.

The interactive profile-based self-learning program module 104 may direct and/or cause the user device 102 to guide management of the field device 103 based on one or more a device profile, a user profile (e.g., user's privilege), an operation profile (e.g., management history associated with the field device 103 and/or the user), or other profiles related to management of a field device. The interactive profile-based self-learning program module 104 may predict management failures before an actual management attempt is executed. The interactive profile-based self-learning program module 104 may comprise one or more of a device profile context model 104a, a user profile context model 104b, an operation profile context model 104c, a correction model 104d, or other context models.

The device profile context model 104a may have instructions that direct and/or cause the user device 102 to guide management of the field device 103, based on the device profile. In some cases, the user wants to configure the field device 103. The user has never configured a same or similar type of the field device 103 and has limited knowledge of the field device 103; or, the user configured a same or similar type of the field device 103 a long time ago (which may be indicated in the device profile) but needs to re-configure the field device 103, and the user has become unfamiliar with the field device 103. In these cases, the device profile context model 104a may direct and/or cause the user device 102 to assist the user to configure the field device 103. In some cases, after the user device 102 automatically detects the device type of the field device 103, the device profile context model 104a may direct and/or cause the user device 102 to compare (automatically or in response to a request received from the user interface) the device type of the field device 103 with device types of the field devices that have been previously configured, determine that the device type of the field device 103 matches the device type of at least one field device that has been previously configured, and recommend configuring the field device 103 with one or more variable values of at least one field device that has been previously configured. The at least one field device that has been previously configured may be the field device 103 or may be a field device different from the field device 103. For example, the device profile context model 104a may detect the device type of the field device 103. The device profile context model 104a may retrieve, from the remote database 105 or the database 116, data indicating device types of field devices that have been previously configured, and compare the device type of the field device 103 to the retrieved data. Based on the comparison, the device profile context model 104a may determine that the device type of the field device 103 matches one of the device types of field devices that have been previously configured. The device profile context model 104a may retrieve, from the remote database 105 or the database 116, data indicating one or more variable values (e.g., temperature operation ranges) of the matched field device that has been previously configured, and present to the user a recommendation that the user configure the field device 103 based on the one or more variable values of the matched field device that has been previously configured.

The user profile context model 104b may have instructions that direct and/or cause the user device 102 to guide management of the field device 103, based on the user profile. In some cases, the user device 102 may have the user's profile of the user who is using the user device 102 to manage the field device 103. For example, the user may be a newly hired field engineer and is unfamiliar with how to calibrate the field device 103. Information about the field engineer's work history, training history, completed task history, or the like may be stored in the user profile. As an example, if the user profile indicates the field engineer is untrained on a task or has never performed a task, the user profile context model 104b may direct and/or cause the user device 102 to assist the field engineer to calibrate the field device 103. For example, the user profile context model 104b may direct and/or cause the user device 102 to retrieve (automatically or in response to a request received from the user interface) management data indicating how the field device 103 was calibrated in history by other users of same or similar privilege (e.g., other users having same or similar daily work duty, same or similar engineering background) as the current user, and provide recommendations to guide calibration of the field device 103 based on how the field device 103 was calibrated in history by other users of same or similar privilege.

The operation profile context model 104c may have instructions that direct and/or cause the user device 102 to guide management of the field device 103, based on the operation profile. In some cases, before connecting to the field device 103, the user device 102 may detect (e.g., based on the operation profile) that the user has performed a same management operation (e.g., calibration) multiple times (e.g., three times) in a row on multiple field devices. In these cases, the operation profile context model 104c may direct and/or cause the user device 102 to predict that the user may continue to perform calibrations for one or more field devices. Based on such a prediction, after the user device 102 is connected to the field device 103, the user device 102 may present to the user a recommendation that the user calibrate the field device 103. In another example, if one or more maintenance (e.g., calibration) best practices for the field device 103 have changed since the last time the user has managed the field device 103 (the last time the user managed the field device 103 may be determined from the operation profile), the user device 102 may present information regarding the updated best practices, and/or may recommend configuring the field device 103 with one or more variable values corresponding to the updated best practices.

The correction model 104d may have instructions that direct and/or cause the user device 102 to automatically determine whether the user inputs include errors, predict management failures before an actual management attempt is executed, generate alerts based on the errors, and/or provide recommendations to correct the errors. For example, the interactive profile-based self-learning program module 104 may direct and/or cause the user device 102 to calculate a result of a formula (including one or more device variables of the field device 103) with values of device variables entered by the user, and determine if the result of the formula falls out of a predetermined range and/or if the values of the device variables entered by the user cause mathematical error(s). If the result of the formula falls out of a predetermined range and/or if the values of the device variables entered by the user cause mathematical error(s), the interactive profile-based self-learning program module 104 may direct and/or cause the user device 102 to determine that user inputs include errors that may result in management failures. As such, the interactive profile-based self-learning module 104 may direct and/or cause the user device 102 to predict management failures before an actual configuration attempt is executed. The user device 102 may warn the user by presenting the user an error message indicating that the user has input improper values. The interactive profile-based self-learning program module 104 may direct and/or cause the user device 102 to determine proper values of device variables for the current field device 103 based on variable values of a previous field device, which is of the same device type as the current field device 103 and was previously successfully managed, and present to the user recommendations that the user use the proper values to manage the current field device 103.

In some cases, for a single management operation (e.g., a single configuration operation on the field device 103), the interactive profile-based self-learning program module 104 may direct and/or cause the user device 102 to guide management of the field device 103 based on more than one of the device profile, the user profile, or the operation profile. For example, if the user device 102 determines that the user has performed configurations three times in a row on multiple field devices, the operation profile context model 104c may direct and/cause the user device 102 to predict that the user may continue to perform configurations for one or more field devices. After the user device 102 is connected to the field device 103, the operation profile context model 104c may direct and/or cause the user device 102 to present such a prediction to the user. After the user device 102 receives the user's confirmation that the user would like to continue to perform configuration on the connected field device 103, the device profile context model 104a may direct and/or cause the user device 102 to automatically detect the device type of the field device 103, determine that the device type of the field device 103 matches the device type of at least one field device that has been previously configured, and recommend the user configure the field device 103 with one or more variable values of the field device that has been previously configured.

Although not shown, the interactive profile-based self-learning program module 104 may include another model having instructions that direct and/or cause the user device 102 to collect, within a certain period of time (e.g., within 30 day), data indicating processing results associated with a certain management process (e.g., configuration) of a certain type of field device (e.g., type A temperature transmitter); to analyze the collected data; based on the analysis, to determine and/or adjust values of device variable(s) to optimize the management process; and to present to the user a recommendation that the user use the determined and/or adjusted values when managing the field device. For example, the model may have instructions that direct and/or cause the user device 102 to collect, within 30 days, temperature measurements of multiple type A temperature transmitters that were configured with different values of device variables and were put in use after configurations during the 30 days. The model may have instructions that direct and/or cause the user device 102 to analyze the collected temperature measurements and determine (e.g., based on feedbacks from users) that some of temperature measurements are more accurate than others. The model may have instructions that direct and/or cause the user device 102 to determine corresponding values of device variables that were used to configure one or more temperature transmitters, of the multiple type A temperature transmitter, having more accurate measurements, and present to a user a recommendation that the user use one or more of these corresponding values of device variables when the user configures a next type A temperature transmitter. Alternatively, the module may have instructions that direct and/or cause the user device 102 to determine that all the temperature measurements deviate the actual temperatures by a predetermined threshold. In this case, the model may have instructions that direct and/or cause the user device 102 to provide adjusted variable values that may result in more accurate temperature measurements, and present to a user a recommendation that the user use the adjusted variable values when configuring a next type A temperature transmitter.

Figure 2C:
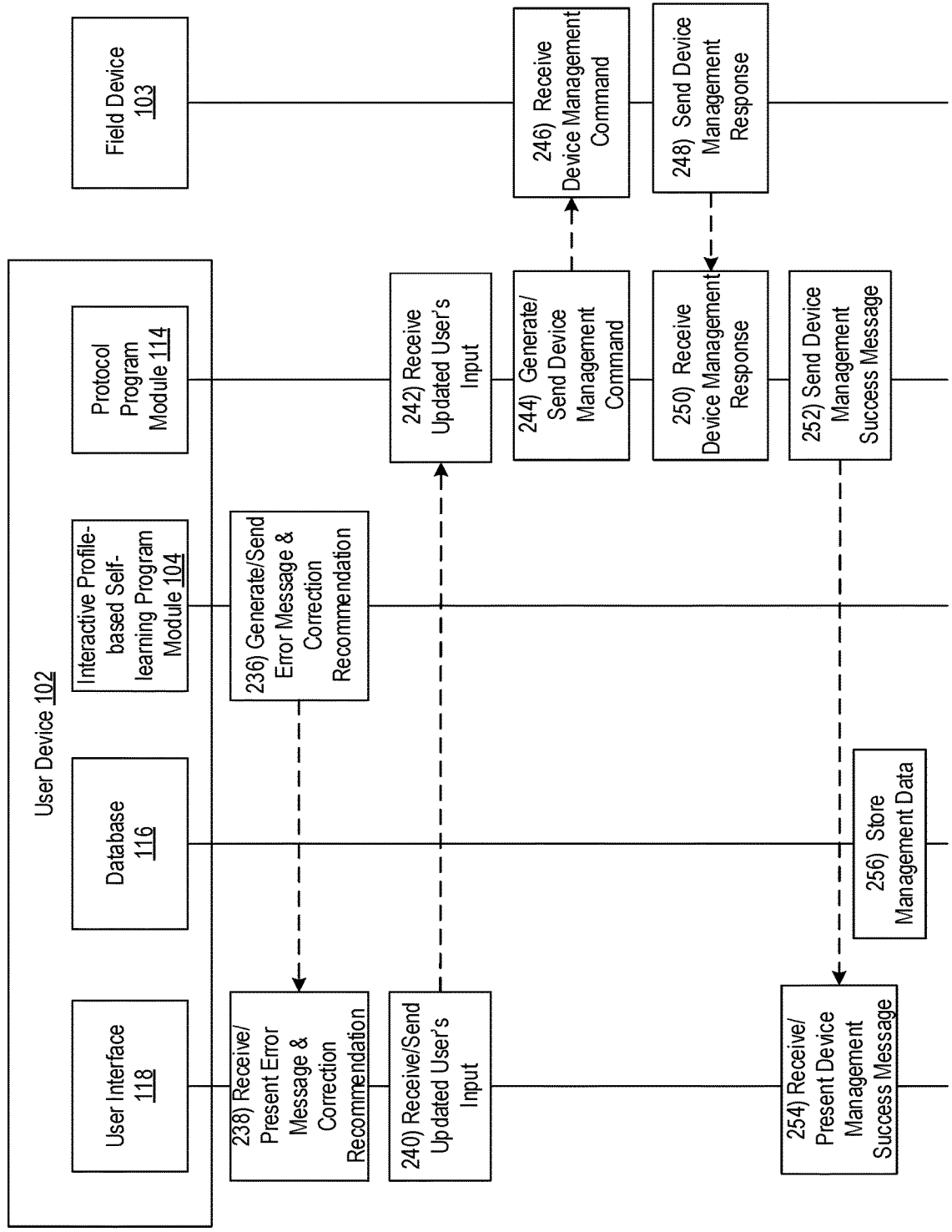

FIGS. 2A-2C depict an illustrative event sequence for managing a field device using a computing device, on which the interactive profile-based self-learning program module is installed, in accordance with one or more example embodiments. Referring to FIG. 2A, at step 202, the user interface 118 of the user device 102 may receive the user's profile and a connection request to connect to a field device. For example, the user may initiate the installed interactive profile-based self-learning program module 104 (e.g., by clicking on an icon representing the installed interactive profile-based self-learning program module 104, the icon displayed on the screen of the user device 102), enter the user's profile (e.g., user's work duty, user's engineering background, user's job title) via the user interface 118, and enter a connection request to connect to a field device (e.g., by choosing a field device connection option presented via the user interface 118). If the interactive profile-based self-learning program module 104 is already installed on the user device 102, the user may initiate the installed interactive profile-based self-learning program module 104, sign in to the user's existing profile, and enter a connection request to connect to the field device. The interactive profile-based self-learning program module 104 may provide a list of field devices that have been previously connected to, and allow the user to select a field device from the list of field devices to enter the connection request. In some cases, after the user initiates the interactive profile-based self-learning program module 104, the interactive profile-based self-learning program module 104 may automatically search for (e.g., by periodically transmitting a searching signal that is recognizable to field devices) any connectable field device (e.g., within connection distance) without requiring the user entering a connection request. At step 204, the user interface 118 may send the connection request along with the user's profile. At step 206, the database 116 of the user device 102 may store the user's profile. In some cases, the user device 102 may store the user profile in the remote database 105. In some cases, the user profile may already be stored in the remote database 105, and the user device 102 may store any updates to the user profile stored in the remote database 105.

In some cases, the user may use user credentials (e.g., username, password) to log in the interactive profile-based self-learning program module 104. The interactive profile-based self-learning program module 104 may direct and/or cause the user device 102 to associate the user's profile with the user's credentials. The user's profile may be stored in one or more of the remote database 105 or the database 116. In these cases, at step 202, instead of entering the user profile, the user may enter user credentials; at step 204, instead of sending the user profile to the database 116, the user interface 118 may send the user credentials to the interactive profile-based self-learning program module 104, and the interactive profile-based self-learning program module 104 may retrieve, from one or more of the remote database 105 or the database 116, the user's profile associated with the user's credentials; and at step 206, the database 116 may record what user's profile was retrieved.

In some cases, the user may have previously used the interactive profile-based self-learning program module 104 to manage one or more field devices, and the user's credentials may be associated with a management history of the user (e.g., what management operations that the user has performed on one or more field devices). In these cases, the interactive profile-based self-learning program module 104 may retrieve, from one or more of the remote database 105 or the database 116, the management history associated with the user's credentials; and at step 206, the database 116 may record what management history of the user was retrieved.

At step 208, the protocol program module 114 may receive the connection request from the user interface 118. The protocol program module 114 may direct and/or cause the user device 102 to support a communication protocol such that the user device 102 may establish communications with the field device 103. At step 210, the protocol program module 114 may generate, based on the received connection request, a device connection command that may be received by the field device 103 via the communication protocol and that may be processed by the field device 103; and the protocol program module 114 may send the device connection command to the field device 103.

At step 212, the field device 103 may receive the device connection command. The field device 103 may process the device connection command to connect to the user device 102 using the communication protocol. At step 214, the field device 103 may send a device connection response indicating that the field device 103 is connected to the user device 102. The field device 103 may send the device profile to the protocol program module 114. At step 216, the protocol program module 114 may receive the device connection response and be informed that the field device 103 is connected to the user device 102. The protocol program module 114 may receive the device profile of the field device 103 from the field device 103.

Referring to FIG. 2B, at step 218, the protocol program module 114 may generate, based on the device connection response, a connection success message indicating the successful connection between the field device 103 and the user device 102. The protocol program module 114 may send, to the user interface 118, the connection success message and the device profile of the field device 103. The protocol program module 114 may send the device profile to the database 116. At step 220, the database 116 may store the device profile of the field device 103. In some cases, the user device 102 may store the device profile in the remote database 105.

At step 222, the user interface 118 may receive the device profile of the field device 103 and the connection success message indicating the successful connection, and display, on the screen of the user device 103, the corresponding text and/or graphical indications of the device profile of the connected field device 103. For example, the user interface 118 may display a text message, e.g., "Connected field device is SMARTLINE® Temperature Transmitter STT700 REV1" (as shown in FIG. 5C which will be described later).

At step 223, the user interface 118 may receive a management request from the user to indicate what management process the user wants to operate on the field device 103. For example, the user may enter a device configuration request to configure the field device 103. As a further example, the user may enter a device calibration request to calibrate the field device 103.

At step 224, the interactive profile-based self-learning program module 104 may receive the management request. The interactive profile-based self-learning program module 104 may direct and/or cause the user device 102 to automatically identify the field device 103. For example, the interactive profile-based self-learning program module 104 may direct and/or cause the user device 102 to retrieve the device profile of the field device 103 from one or more of the database 116 or the remote database 105, and compare the device profile of the field device 103 with one or more known device profiles pre-stored in one or more of the database 116 or the remote database 105. In some cases, new field device products (e.g., new types of field devices, new models of a same type of field device) may be developed, or device profiles of the existing field devices may change (e.g., the device description version of an existing field device may be updated). In these cases, the database 116 or the remote database 105 may be updated to, for example, add devices profiles of the new field device products, and/or update the pre-stored device profiles. The interactive profile-based self-learning program module 104 may direct and/or cause the user device 102 to determine the device type and/or the compatible device version (or compatible device description versions) of the field device 103 if there is a match between the device profile of the field device 103 and the one or more known device profiles. As such, after the field device is identified, the user device 102 may determine proper commands and display formats corresponding to the identified field device and use the proper commands and display formats to perform management of the field device 103.

The interactive profile-based self-learning program module 104 may direct and/or cause the user device 102 to, automatically, or in response to a user's request for assistance, determine options, recommendations, inquires, and/or predictions to guide the user of the computing device to manage the connected field device 103, based on the management request and one or more automation/self-learning algorithms. The one or more automation/self-learning algorithms may be based on one or more of the device profile, the user profile, the operation profile, or other profiles related to management of a field device. Details of the one or more automation/self-learning algorithms will be further discussed in connections with FIG. 4.

Figure 5D:
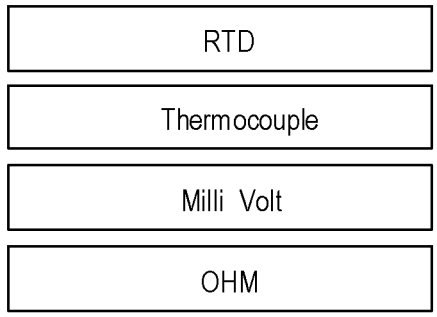

At step 226, the interactive profile-based self-learning program module 104 may send, to the user interface 118, the determined options, recommendations, inquires, and/or predictions to guide the user of the computing device to manage the connected field device 103. At step 228, the user interface 118 may receive the options, recommendations, inquires, and/or predictions, and display the corresponding text and/or graphical indications on the screen of the user device 102 for the user to consider, select, and/or respond to. For example, as shown in FIG. 5D which will be described later, the user interface 118 may display a list of temperature input types that are supported by the field device 103 (e.g., the SMARTLINE® Temperature Transmitter STT700 REV1) on the screen of the user device 102 for the use to select from.

At step 230, the user interface 118 may receive the user inputs from the user. The user inputs may include user's selection of options (e.g., the user selecting a desired temperature input type from a list of supported temperature input types presented to the user), user's confirmation of predictions (e.g., the user clicking on a confirmation button displayed via the user interface 118 to confirm that the user wants to continue to perform calibration process on the field device as predicted), user's acceptation of recommendations (e.g., the user clicking on a confirmation button displayed via the user interface 118 to confirm that the user wants to use default variable ranges as recommended), user's data entry in response to inquiries (e.g., the user entering desired value ranges of device variables in response to requirements presented to the user via the user interface 118), etc. In some cases, the user interface 118 may display, on the screen of the user device 102, the user inputs for the user's reference. The user interface 118 may send the user inputs to the interactive profile-based self-learning program module 104. At step 232, the interactive profile-based self-learning program module 104 may receive the user inputs.

At step 234, the interactive profile-based self-learning program module 104 may direct and/or cause the user device 102 to automatically determine whether the user inputs include errors and predict management failures before an actual configuration attempt is executed. For example, the user may enter variable values for device variables of the field device 103 to configure the field device 103. The interactive profile-based self-learning program module 104 may direct and/or cause the user device 102 to calculate a result of a formula (including one or more device variables of the field device 103) with the variable values entered by the user, and determine if the result of the formula falls out of a predetermined range and/or if the variable values entered by the user cause mathematical error(s). If the result of the formula falls out of a predetermined range and/or if the variable values entered by the user cause mathematical error(s), the interactive profile-based self-learning program module 104 may direct and/or cause the user device 102 to determine that the user inputs include errors that may result in management failures. As such, the interactive profile-based self-learning module 104 may direct and/or cause the user device 102 to predict management failures before an actual configuration attempt is executed. The user device 102 may present to the user a prediction (e.g., a warning message or an error message) that if the field device 103 uses the variable values entered by the user, an error would occur during the actual configuration attempt.

Referring to FIG. 2C, at step 236, the interactive profile-based self-learning program module 104 may direct and/or cause the user device 102 to generate error messages indicating that one or more user's data entries are incorrect. The interactive profile-based self-learning program module 104 may direct and/or cause the user device 102 to retrieve historical data (stored in one or more of the remote database 105 or the database 116) and provide correction recommendations on how to correct the errors based on the historical data. For example, the user may enter variable values for device variables of the field device 103 to configure the field device 103, and the user device 102 may determine that the user inputs include errors. The interactive profile-based self-learning program module 104 may direct and/or cause the user device 102 to retrieve, from one or more of the remote database 105 or the database 116, historical data indicating variable values of another field device that is the same type of the field device 103 and was previously successfully configured, and provide correction recommendations to recommend using the variable values of the another field device that is the same type of the field device 103 and was previously successfully configured. Alternatively, or in addition, the interactive profile-based self-learning program module 104 may direct and/or cause the user device 102 to retrieve, from one or more of the remote database 105 or the database 116, pre-stored desired variable value ranges, and provide correction recommendations to recommend using the desired variable value ranges. The interactive profile-based self-learning program module 104 may direct and/or cause the user device 102 to send the error messages and/or the correction recommendations to the user interface 118. At step 238, the user interface 118 may receive the error messages and the correction recommendations, and present them via the user interface 118.

At step 240, the user interface 118 may receive updated user inputs, which may be updated based on the correction recommendations. In some cases, the user interface 118 may display, on the screen of the user device 102, the updated user inputs for the user's reference. At step 242, the protocol program module 114 may receive the updated user inputs.

At step 244, the protocol program module 114 may generate, based on the updated user inputs, a device management command to manage the field device 103. The protocol program module 114 may send, using the communication protocol, the device management command to the field device 103 to manage the field device 103. For example, the protocol program module 114 may send a device configuration command along with the variable values set by the user to instruct the field device 103 to download the variable values. In some cases, the user interface 118 may display text and/or graphical indications that the device management is in progress.

At step 246, the field device 103 may receive, using the communication protocol, the device management command. At step 248, the field device 103 may execute the device management command. The field device 103 may then send, using the communication protocol, a management response indicating if the device management is successfully completed. For example, the field device 103 may download the variable values and send a device management response indicating that the device configuration is successfully completed.

At step 250, the protocol program module 114 may receive, using the communication protocol, the device management response indicating if the device configuration is successfully completed. At step 252, the protocol program module 114 may send a device management success message indicating whether the device management is successfully completed. At step 254, the user interface 118 may receive the device management success message and present the device management success message to the user.

At step 256, the database 116 may store management data that is associated with the management of the field device 103. The management data may comprise data indicating one or more of: the type of the management operation (e.g., device configuration, device calibration, device diagnostics, device monitoring), variable values set/used in the management operation, the operation time of the management operation, whether the management was successful, operational steps included in the management operation, or any other data associated with the management operation. In some cases, the interactive profile-based self-learning program module 104 may direct and/or cause the user device 102 to associate the management data with the user profile and/or the device profile. Association between the management data and the user profile may create a management history associated with the user, and association between the management data and the device profile of the field device 103 may create a management history associated with the field device 103. For example, after the management data is associated with the user profile, the user device 102 may create a management history associated with the user indicating one or more of: the management types of the management operations that the user has performed on field device(s), the operation order of the management operations that the user has performed, the successful rate of the management operations that the user has performed, user inputs associated with the management operations that the user has performed, operational steps of each of the management operations that the user has performed, or any data associated with the management operations that the user has performed. After the management data is associated with the device profile of the field device 103, the user device 102 may create a management history associated with the field device 103 indicating one or more of: the management types of the management operations that have been performed on the field device 103, the operation order of the management operations that have been performed on the field device 103, whether each of the management operations that have been performed on the field device 103 is successful, operational steps of each of the management operations that have been performed on the field device 103, variable values used in each of the management operations that have been performed on the field device 103, or any data associated with the management operations that have been performed on the field device 103.

The order of the events in FIGS. 2A-2C may vary. For example, step 220 may occur parallel to or after step 222. Step 256 may occur multiple times and may occur parallel to any of steps 204-258. One or more of steps 206, 220, or 256 may be combined to one step. One or more steps 224-242 may occur multiple times until all the user inputs that are required by a management operation are received. One or more of the steps may be duplicated or omitted. For example, steps 236, 238 and 240 may be omitted if no errors were found in step 234. Steps may be combined and/or otherwise modified.

Figure 3:
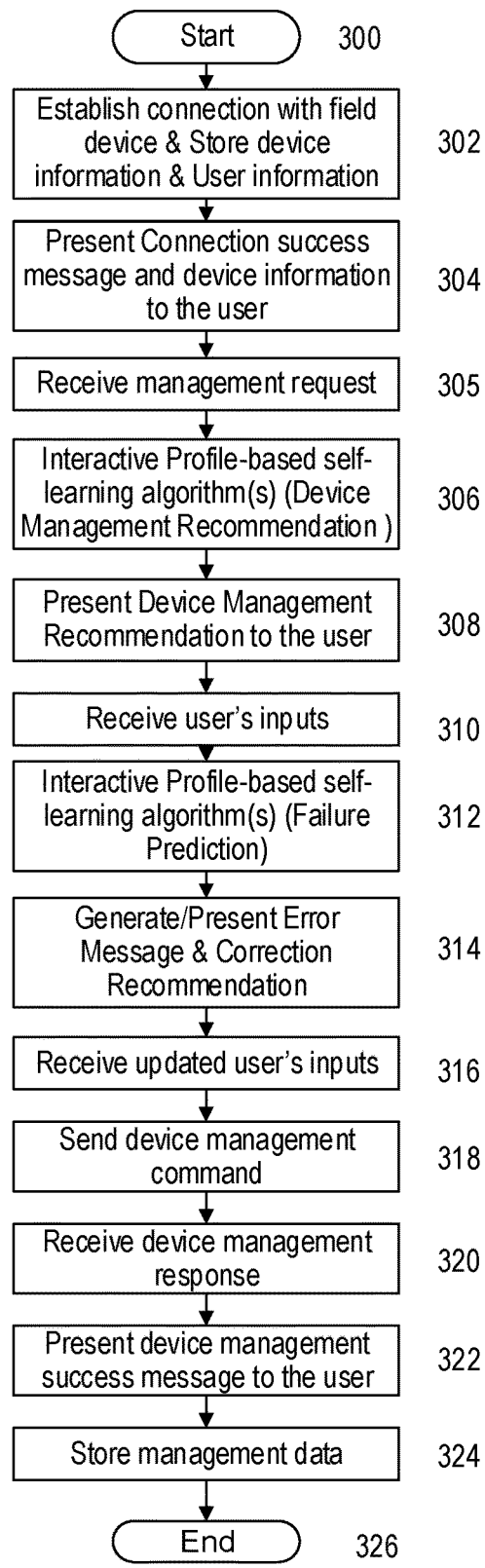
FIGS. 3-4 depict illustrative methods for managing a field device using a computing device, on which the interactive profile-based self-learning program module is installed, in accordance with one or more example embodiments.
Figure 4:
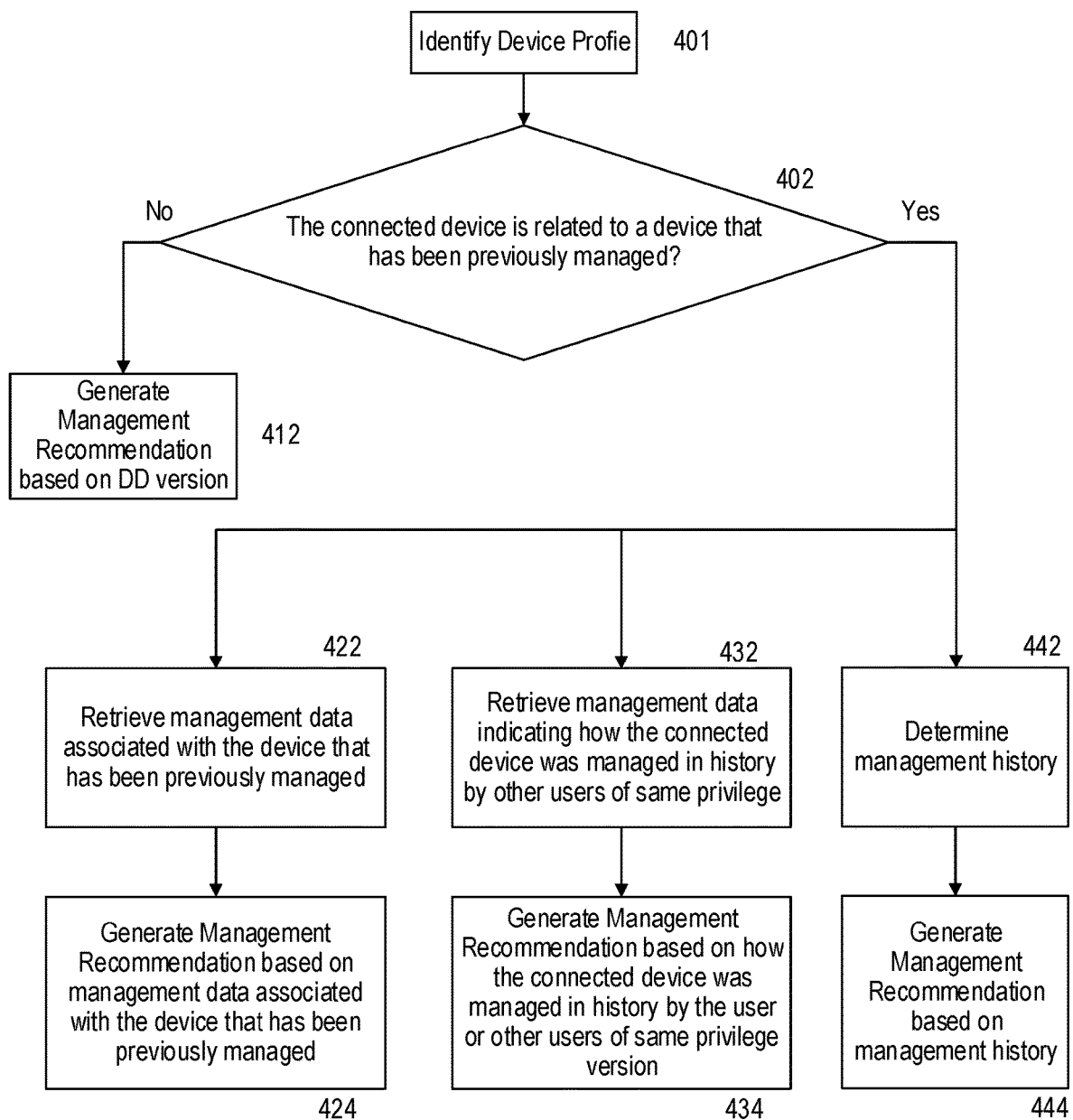

FIGS. 3-4 depict illustrative methods for managing a field device using a computing device, on which the interactive profile-based self-learning program module is installed, in accordance with one or more example embodiments. Referring to FIG. 3, at step 300, the method may start with the user device 102 downloading and installing the interactive profile-based self-learning program module 114.

At step 302, as previously discussed in connection with steps 202-220 in FIGS. 2A and 2B, the user device 102 may automatically, or in response to a connection request, establish a communication with the field device 103 using a communication protocol (e.g., Highway Addressable Remote Transducer protocol). For example, as previously discussed in connection with step 202, after the user initiates the interactive profile-based self-learning program module 114, the user may choose, via the user interface 118, a field device connection option to request the user device 102 connect to a field device. Alternatively, the initiated interactive profile-based self-learning program module 104 may automatically search for any connectable field device without requiring the user entering a field device connection request. The user device 102 may obtain the user profile and the device profile of the connected field device 102, and store the user profile and the device profile in one or more of the database 116 or the remote database 105.

At step 304, as previously discussed in connection with step 222 in FIG. 2B, the user device may display text and/or graphical indications on the screen associated with the user device 102 to show the user that the user device 102 is connected with a field device 103 and to show the user the device profile of the connected field device 103.

At step 305, as previously discussed in connection with step 223 in FIG. 2B, the user interface 118 may receive a management request from the user to indicate what management process the user wants to operate on the field device 103.

At step 306, as previously discussed in connection with step 224 in FIG. 2B, the user device 102 may automatically identify the device type of the field device 103 and the compatible device version (or compatible device description version) of the field device 103. After determining the device type of the field device 103 and the compatible device version, the user device 102 may use proper commands and display formats to perform management of the field device 103. The user device 102 may, automatically, or in response to a user's request for assistance, determine options, recommendations, inquires, and/or predictions to guide the user to manage the connected field device 103, based on one or more automation/self-learning algorithms. The one or more automation/self-learning algorithms may be based on one or more the device profile, the user profile, the operation profile, or other profiles related to management of a field device. Details of the one or more automation/self-learning algorithms will be further discussed in connections with FIG. 4.

At step 308, as previously discussed in connection with steps 226 and 228 in FIG. 2B, the user device 102 may display text and/or graphical indications of the options, recommendations, inquires, and/or predictions on the screen of the user device 102 for the user to consider, select, and/or respond to.

At step 310, as previously discussed in connection with steps 230 and 232 in FIG. 2B, the user device 102 may receive user inputs (e.g., selection of options, confirmation of predictions, acceptation of recommendations, data entry in response to requires).

At step 312, as previously discussed in connection with step 234 in FIG. 2B, the user device 102 may automatically determine whether the user inputs include errors, generate alerts corresponding to the errors, and/or provide recommendations to correct the errors.

At step 314, as previously discussed in connection with steps 236 and 238 in FIG. 2C, the user device 102 may generate error messages indicating that one or more user's data entries are incorrect. The user device 102 may provide correction recommendations on how to correct the errors (e.g., based on the historical data). The user device may display text and/or graphical indications of the error messages and the correction recommendations on the screen of the user device 102 for the user to consider, select, and/or respond to.

At step 316, as previously discussed in connection with steps 240 and 242 in FIG. 2C, the user device 102 may receive the updated user inputs, based on the correction recommendations.

At step 318, as previously discussed in connection with step 244 in FIG. 2C, the user device 102 may generate, based on the updated user inputs, a device management command and send the device management command to the field device 103 to manage the field device 103.

At step 320, as previously discussed in connection with steps 246-250 in FIG. 2C, the user device 102 receives, from the field device 103, a device management response indicating whether the device management is successfully completed.

At step 322, as previously discussed in connection with steps 252-254 in FIG. 2C, the user device 102 may display text and/or graphical indications of a device management success message on the screen of the user device 102 to show, via the user interface, whether the management of the field device 103 is successfully completed.

At step 324, as previously discussed in connection with step 256 in FIG. 2C, the user device 102 may store the management data that is associated with the management of the field device 103. The process may end at step 326.

The order of the steps in FIG. 3 may vary. For example, step 324 may occur multiple times and may occur parallel to any of steps 302-322. One or more steps 306-316 may occur multiple times, e.g., until all the user inputs required by a management operation are received. One or more of the steps may be duplicated or omitted. For example, steps 314 and 316 may be omitted if no errors were found in step 312. Steps may be combined and/or otherwise modified.

FIG. 4 depicts illustrative example automation/self-learning algorithms using one or more the device profile of the field device 103, the user profile, or the operation profile. One or more steps included in FIG. 4 may replace step 306 in FIG. 3 (or step 224 in FIG. 2B).

Referring to FIG. 4, at step 401, the user device 102 may identify the device profile of the connected field device 103. For example, the user device 102 may retrieve the device profile of the field device 103 from one or more of the database 116 or the remote database 105, and compare the device profile of the field device 103 with one or more known device profiles pre-stored in one or more of the database 116 or the remote database 105. Based on the comparison, the user device 102 may determine whether there is a match between the device profile of the field device 103 and a known device profile. If a match is determined, the user device 102 may determine that the device profile of the field device 103 is the same as the matched known device profile. The user device 102 may determine that commands and display formats corresponding to the field device 103 are same as those of the matched known device profile. As such, the field device 103 is identified, and the corresponding commands and display formats are determined.

At step 402, the user device 102 may determine whether the field device 103 is related to a field device that has been previously managed. The user device may compare the device profile (e.g., device type) of the field device 103 with device profiles (stored in one or more of the remote database 105 or the database 116) of previously managed field devices, and determine that the device profile of the field device 103 matches any of the device profiles of previously managed field devices. After determining that there is a match, the user device 102 may determine that the field device 103 is related to a previously managed field device. If, instead the user device 102 determines that there is no match, the user device 102 may determine that the field device 103 is not related to any previously managed field device. The previously managed field device may be the field device 103 or a field device that is different from the field device 103.

If the user device 102 determines that the field device 103 is not related to a previously managed field device, the process proceeds to step 412. At step 412, the user device 102 may generate options and/or recommendations for operational steps of the management operation based on the device profile of the field device 103. For example, in an event of configuration of the field device 103, the user device 102 may retrieve, from one or more the remote database 105 or the database 116, pre-stored default operational steps (e.g., recommended by the manufacturer of the field device 103) associated with the device profile of the field device 103, and display the default operational steps via the user interface 118 to guide the user to configure the field device 103. The operational steps may comprise selecting and/or entering one or more of sensor types, control mode, engineering units for variables, or the like. The user device 102 may generate inquiries prompting for input of variable values (and/or ranges of variables), and/or generate, based on pre-stored default variable values (and/or ranges of variables), options and/or recommendations for the user to determine variable values (and/or ranges of variables).

If the user device 102 determines that the field device 103 is related to a previously managed field device, the process may proceed to one or more steps 422, 432, or 442 in parallel or in any order.

At step 422, the user device 102 may start providing options, recommendations, inquires, and/or predictions to guide the user to manage the field device 103, for example, based on the device profile. The user device 102 may retrieve management data associated with a previously managed field device that is related to the field device 103.

At step 424, the user device may automatically, or in response to a user's request for assistance, provide options, recommendations, inquires, and/or predictions, based on management data associated with the previously managed field device that is related to the field device 103. The user device 102 may recommend using operational steps and/or variable values used for the configuration, calibration, diagnostics, and/or monitoring of the previously managed field device. For example, the user device sends a device configuration request to configure the field device 103. The user device may determine that the field device 103 and a previously configured field device are the same type of temperature transmitters, and the previously configured field device has an older device version of and supports device variables A, B, and C, while the field device 103 has a newer device version and supports device variables A, B, C, and D. The retrieved management data associated with the previously configured field device may indicate values set for device variables A, B, and C in the previous configuration of the previously configured field device, and the user device 102 may recommend using the same values for device variables A, B, C of the field device 103 in the current configuration of the field device 103. In some cases, in the above example, the user device may send a device calibration request or some other management requests, instead of the device configuration request. Even though the user device 102 determines that the field device 103 and the previously configured field device are the same type of temperature transmitters, the user device 102 may determine that the previously configured field device has never been calibrated before and may find no historical data associated with calibration of this particular temperature transmitter type. In these case, similar to step 412, the user device 102 may make reference to the pre-stored default operational steps and/or the pre-stored default variable values, and make corresponding management recommendations.

At step 432, the user device 102 may start providing options, recommendations, inquires, and/or predictions to guide the user to manage the field device 103, for example, based on the user profile. For example, the user may be unfamiliar with how to calibrate the field device 103, and may send a request for assistance on how to calibrate the field device 103. In response to the request for assistance, the user device 102 may search one or more of the remote database 105 or the database 116 for management data associated with how the field device 103 was calibrated in history by other users of same or similar privilege as the current user. At step 434, the user device 102 may provide options, recommendations, inquires, and/or predictions, based on how the field device 103 was calibrated by other users of same or similar privilege. For example, in an event of configuration of the field device 103, the user device 102 may determine that the field device 103 was configured by two other users of the same or similar privilege. The user device 102 may display, on the screen of the user device 102, text and/or graphical interactive indications of how the field device 103 was managed by other two users of same or similar privilege, and ask the current user to choose one of more of the displayed text and/or graphical interactive indications to formulate the current user's own configuration menu.

At step 442, the user device 102 may start providing options, recommendations, inquires, and/or predictions to guide the user to manage the field device 103, for example, based on the operation profile. As discussed previously, as an example, one or more of the remote database 105 or the database 116 may store management history associated with the user profile, and/or management history associated with previously managed field devices that are related to the field device 103. The operation profile may be associated with one or more of those management histories. For example, the user device 102 may retrieve, based on the user's credentials and from one or more remote database 105 or the database 116, data indicating management types of the management operations the user has performed. The user device 102 may determine that, before the user device 102 connects to the field device 103, the user has used the user device 102 to configure one or more field devices a certain number of times (e.g., five times in a row). After the user device 102 connects to the field device 103, the user device 102 may predict that the user may continue to perform a configuration operation using the field device 103. The user device 102 may generate a management recommendation based on such a prediction. In this example, the user device 102 may omit step 402. That is, without determining whether the field device 103 is related to a previously managed field device (without performing step 402), the user device 102 may predict, based on the repeated same type of management (e.g., five times of configuration in a row), that the user is likely to perform a configuration operation on the field device 103.

As another example, the user device 102 may retrieve, based on the device profile of the field device 103 and user's credentials, and from one or more remote database 105 or the database 116, management data associated with the management types of the management operations that have been performed on two previously managed field devices that are related to the field device 103. The user device 102 may determine that configuration, calibration, and diagnostics operations were performed on one of the previously managed field devices, and that configuration, monitoring, and calibration were performed on the other previously managed field devices. The user device 102 may determine that both of configuration and calibration operations were performed on both of the two previously managed field devices. Based on that, the user device 102 may predict that the user may want to perform configuration and calibration operations on the currently connected field device 103. The user device 102 may generate a management recommendation based on such a prediction.

Although not shown, alternatively or in addition, the user device 102 may collect, within a certain period of time (e.g., within 30 day), data indicating processing results associated with a management process (e.g., configuration) of a certain type of field device (e.g., type A temperature transmitter); to analyze the collected data; based on the analysis, determine and/or adjust values of device variable(s) to optimize the management process; and to present to the user a recommendation that the user use the determined and/or adjusted values when managing the field device. These steps may occur in parallel to, prior to, or following any one or more of steps 401-444.

The order of the events in FIG. 4 may vary. For example, steps 422 and 424, steps 432 and 434, or steps 442 and 444 may occur in parallel or in any order. Steps may be combined, duplicated, omitted, and/or otherwise modified. One or more than one of the user profile, the device profile, or the operation profile may be used and/or considered in any step shown in FIG. 4. All other data and/or historical data (stored in a database) associated with field device management may be used and/or considered in any step shown in FIG. 4.

FIGS. 5A-5J depict illustrative interactive user interfaces for managing a field device using a computing device, on which the interactive profile-based self-learning program module is installed, in accordance with one or more example embodiments.

FIG. 5A is an example interactive user interface presenting a welcome message (e.g., "Hi . . . Welcome to Smart Configurator . . . ! A Smart Assistant tool . . . !") to indicate that the interactive profile-based self-learning program module is successfully initiated.

FIG. 5B is an example interactive user interface presenting indication that the user device 102 is automatically searching for any connectable field device (e.g., the "Scanning" message). For example, the user device 102 may periodically transmit a searching signal that is recognizable to field devices. If a field device that has not been connected to the user device 102 is located within a receiving range of the searching signal, the field device may respond to the searching signal by transmitting a response signal indicating that the field device can be connected to the user device 102. If the user device 102 does not receive any response signal from a field device, the user device 102 may display the "scanning" message on the display screen to indicate that the user device 102 is actively searching for a field device for connection.

FIG. 5C is an example interactive user interface presenting that the user device 102 is connected to the field device 103, presenting the device profile of the field device 103 (e.g., SMARTLINE® Temperature Transmitter STT700 REV1), and presenting management options (e.g., "What would you like to Do?" options) for the user to choose from. In this example, a SMARTLINE® Temperature Transmitter STT700 REV1 is located within a receiving range of the searching signal, the user device 102 may connect to the SMARTLINE® Temperature Transmitter STT700 REV1. The user device 102 may receive data signals, transmitted from the SMARTLINE® Temperature Transmitter STT700 REV1, indicating that its device type. Based on the received data signals, the user device 102 may display the device profile on the display screen (e.g., by display a message "Connected Device is SMARTLINE® Temperature Transmitter STT700 REV1"). The user device 102 may automatically identify the device profile of the SMARTLINE® Temperature Transmitter STT700 REV1 by comparing the detected device profile with pre-stored known device profiles stored in the remote database 105 or the database 116. The user device 102 may present to the user a list of management process options (e.g., "Configure Device," "View Device Diagnostic," or "Calibrate the Device") for the user to choose from. After the user selects a desired management process, the management process is configured according to the user selection. Specifically, in the illustrated example, if the user selects to configure device, the user device 102 may start guiding a configuration process. If the user selects to view device diagnostics, the user device 102 may start a process of retrieving displaying device diagnostics results and displaying those results on the display screen. If the user selects to calibrate the device, the user device 102 may provide guidance for a calibration process.

In the case where the user chooses to "Configure Device" from the presented management options, FIG. 5D is an example interactive user interface presenting indication that the user device 102 provides, e.g., based on the device profile, management guidance to configure the field device 103 (e.g., displaying that "Connected Device is Dual Input Temperature Transmitter," providing a list of temperature input types that are supported by the SMARTLINE® Temperature Transmitter STT700 REV1 by providing "Supported Temperature Input Types," providing options of temperature input types that are supported by the SMARTLINE® Temperature Transmitter STT700 REV1 to "Select Sensor 1 Input Type"), and the user device 102 displays the user's selections (e.g., "Sensor 1 Input Type configured as RTD"). After the user selects sensor 1 input type, an input type of sensor 1 is configured according to the user selection. Specifically, in the illustrated example, if the user selects RTD, the sensor 1 input type is configured as RTD. If the user selects thermocouple, the sensor 1 input type is configured as thermocouple. If the user selects millivolt, the sensor 1 input type is configured as millivolt. If the user selects ohm, the sensor 1 input type is configured as ohm.

FIG. 5E is another example interactive user interface presenting indication that the user device 102 provides, e.g., based on the device profile, management guidance to configure the field device 103 (e.g., providing options of temperature input types supported by the SMARTLINE® Temperature Transmitter STT700 REV1 to "Select Sensor 2 Input Type," providing options of engineering units supported by the SMARTLINE® Temperature Transmitter STT700 REV1 to "Configure Engineering Unit from below available Units"), and the user device 102 displays the user's selections (e.g., "Sensor 2 Input Type configured as RTD," "Configured Unit is Deg C"). After the user selects sensor 2 input type, an input type of sensor 2 is configured according to the user selection. Specifically, in the illustrated example, the user selects RTD, the sensor 2 input type is configured as RTD. After the user selects an engineering unit type, the engineering unit is configured according to the user selection. Specifically, in the illustrated example, the user selects Deg C, the engineering unit type is configured as Deg C.

Similarly, FIG. 5F is an example interactive user interface presenting indications that the user device 102 provides management guidance to configure the range of the field device 103 (e.g., "Re-range the device," "Keep default range"), and the user device 102 displays the user's selections and/or user's other inputs (e.g., enter "Lower Range Value of Transmitter," enter "High Range Value of Transmitter"). After the user selects what the user wants to do with the temperature range, the user device 102 may provide management guidance based on the user's selection. Specifically, in the illustrated example, if the user selects to re-range the device, the user device 102 may display inquires (e.g., "Enter Low Range Value of Transmitter" and "Enter High Range Value of Transmitter") asking the user to input corresponding variable values (e.g., the user entering "0" for the lower range value of transmitter, and "200" for the high range value of transmitter). Alternatively, if the user selects to keep the default range (e.g., −200 Deg C. to 850 Deg C.), the user device 102 may use the default range to configure the SMARTLINE® Temperature Transmitter STT700 REV1, and the user device 102 does not need to provide the above inquires for inputting the lower range value and the high range value.

Figure 5G:
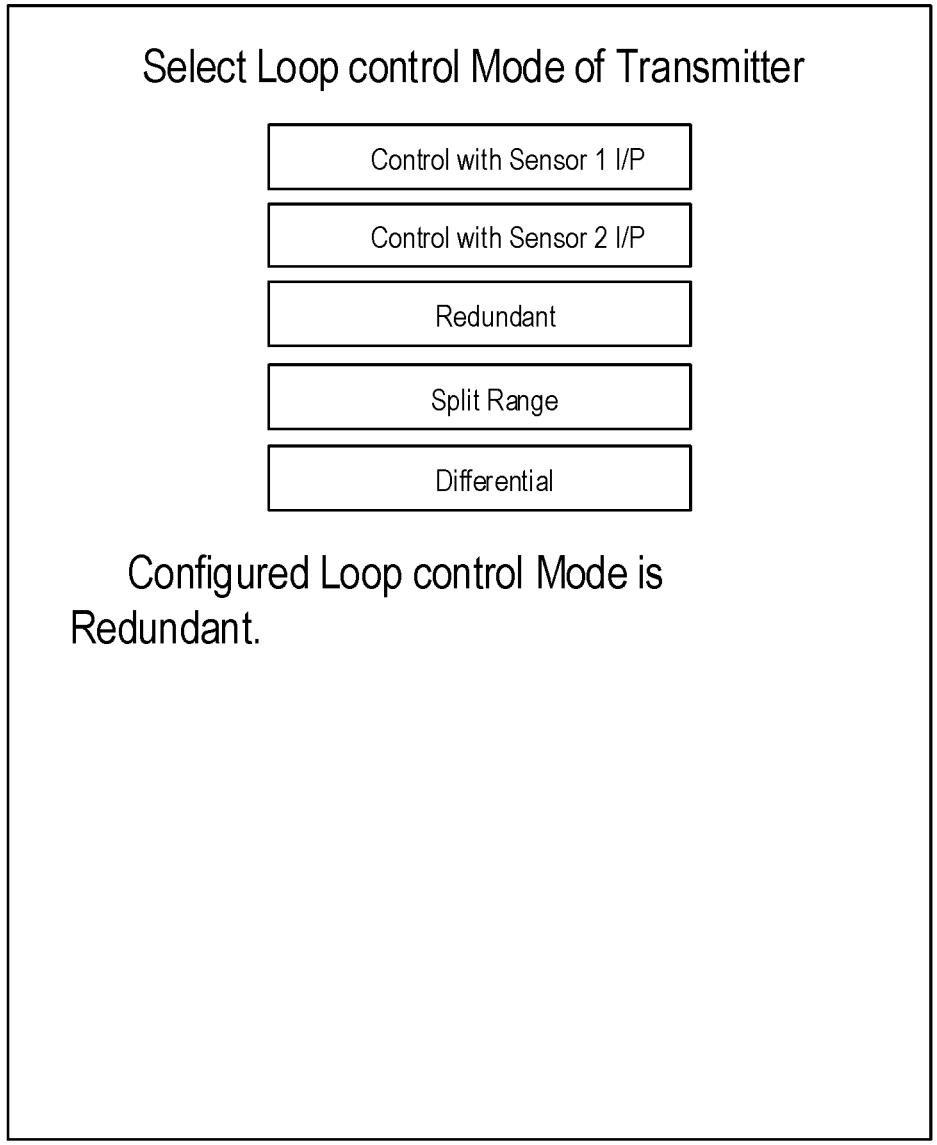

Similarly, FIG. 5G is an example interactive user interface presenting indications that the user device 102 provides management guidance to configure the loop control mode of the field device 103. In the illustrated example, the user device 102 provides a list of loop control modes of transmitter (supported by the SMARTLINE® Temperature Transmitter STT700 REV1) for the user to select from. After the user selects loop control mode, a loop control mode type is configured according to the user selection. Specifically, in the illustrated example, the user selects redundant loop control mode, the loop control mode is configured to be redundant.

Figure 5H:
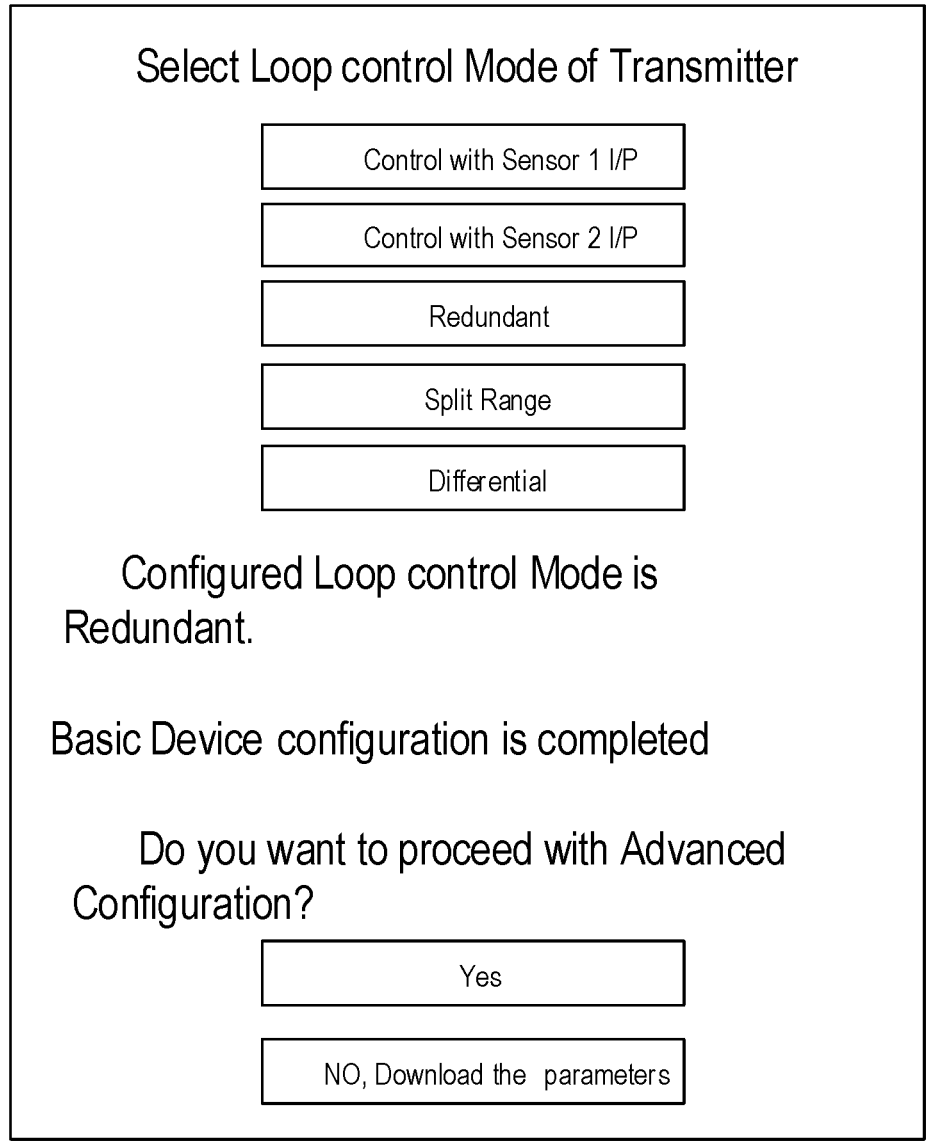

FIG. 5H is an example interactive user interface presenting indication that the user device 102 provides, e.g., based on the device profile, additional management guidance. Specifically, in the illustrated example, the user device 102 presents inquiries asking if the user wants to proceed with advance configuration process. If the user clicks on the "Yes" bottom, the user device 103 may provide additional management guidance to configure the field device 103 in an advanced mode. Alternatively, if the user clicks on the "NO, Download the parameters" bottom, the user device 103 may proceed with parameter downloading. Specifically, in the illustrated example, the user clicks on the "NO, Download the parameters" and selects to download the parameters on the field device.

Figure 5I:
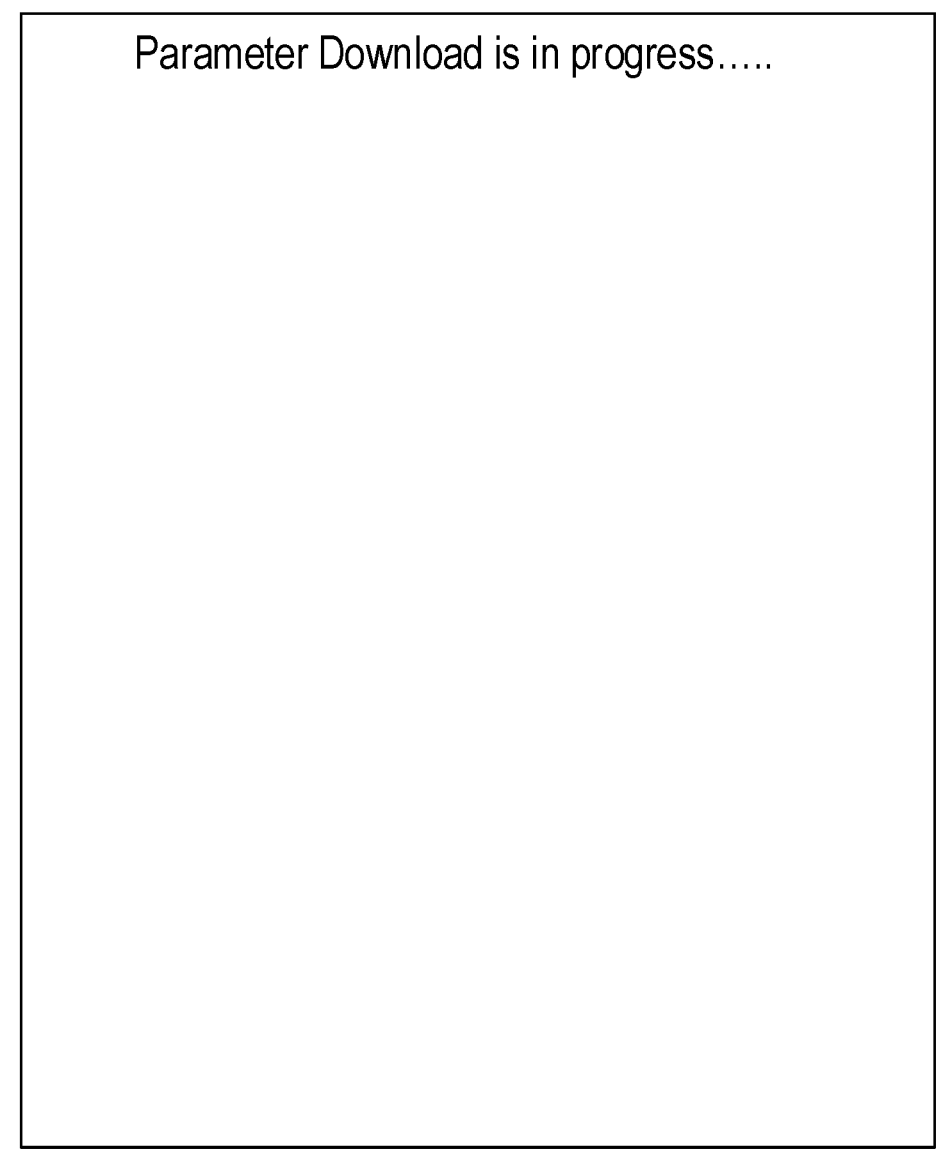

FIG. 5I is an example interactive user interface presenting indication that the device management is in progress. For example, as illustrated, the user interface may indicate that a variable download is in progress. Another illustrative indication of progress may include a progress bar, which may indicate an amount of time elapsed, an amount of time remaining, or the like.

FIG. 5J is an example interactive user interface presenting indication that the device management is successfully completed. The user interface may indicate the steps that were performed. The user interface may indicate whether the device is ready to use, or any additional steps that need to be performed before the device is ready to use.

Figure 6:
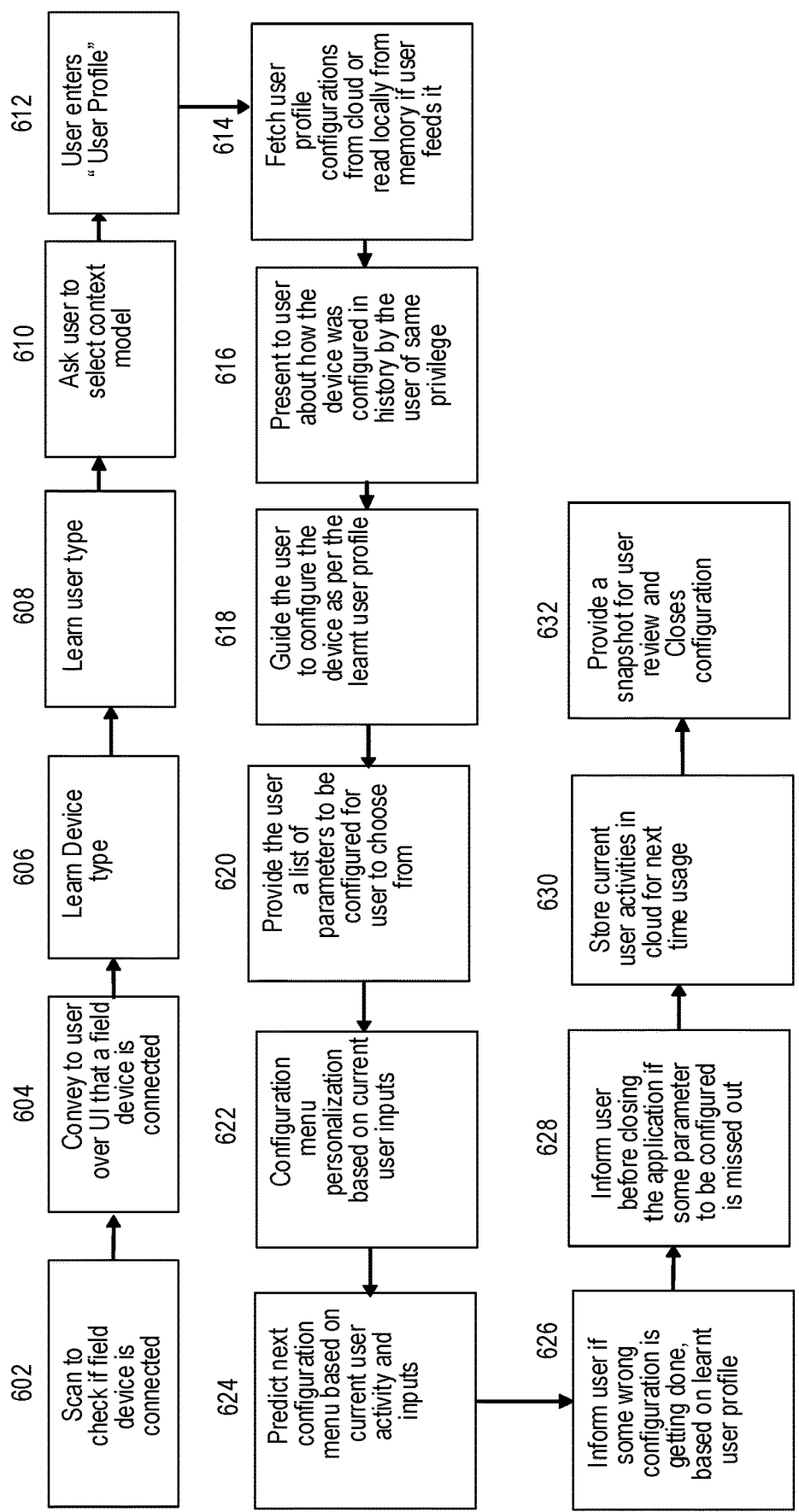
FIG. 6 depicts an example flow sequence for managing a field device using a computing device, on which the interactive profile-based self-learning program module is installed, in accordance with one or more example embodiments.

FIG. 6 depicts an example flow sequence for managing a field device using a computing device, on which the interactive profile-based self-learning program module is installed, in accordance with one or more example embodiments. In the example of FIG. 6, the computing device may guide management of a field device based on user profile.

At step 602, a user device (e.g., a computing device on which the interactive profile-based self-learning program module is installed) may automatically, or in response to a scan request (e.g., a user logging in his user account associated with the interactive profile-based self-learning module), scan any connectable field device. The user device may determine that a field device (e.g., a temperature transmitter) that is located within a connectable range has not been connected to the user device. The user device may connect to this field device. The connected field device may send the device profile to the user device.

At step 604, the user device may present, via a user interface, to a user (e.g., a field engineer logging in his user account associated with the interactive profile-based self-learning module) an indication that the user device is connected to the field device. At step 606, the user device may identify the device profile (e.g., the device type) of the connected field device. For example, the user device may determine that the device profile of the field device matches a device profile pre-stored in the cloud storage and/or a local database.

At step 608, the user device may learn a user type (e.g., a field engineer) of the user. For example, the user device may learn the user type based on the user information included in the logged-in user account. At step 610, the user device may present, via the user interface, an inquiry to the user and ask the user to select a preferred context model (e.g., the device profile context model, the user profile context model, or the operation profile context model) based on which the user device will guide management of the field device. At step 612, the user may select the "User Profile" context model and request for assistance on how to configure the field device. The user device may initiate guidance of management of the field device based on the user profile. In some cases, based on the detected user profile, the user device may automatically, without requiring the user send a request for assistance, initiate guidance of management of the field device based on the user profile.

At step 614, the user device may retrieve, from the cloud storage and/or a local database, the user profile of the user. In some cases, data indicating the user account may be stored in the cloud storage, and the user account may include user profile of the user. In these cases, the user profile may be stored in the cloud storage, and the user device may retrieve the user profile from the cloud storage. In some other cases, the user may enter or update the user profile by inputting, via the user interface, the user profile of the user, and the newly entered or updated user profile may be stored in a local database of the user device. In these cases, the user device may retrieve the user profile of the user from the local database. The user profile may indicate that the user is a newly hired field engineer and has never been trained to manage the particular type of the detected field device.

At step 616, based on the user profile, the user device may search the cloud storage and/or a local database for management data indicating how the field device was configured in history by other users of same or similar privilege. The user device may present, via the user interface, to the user indication how the field device was configured in history by other users of same or similar privilege. For example, the user device may display indication that the same type of field device has been configured 50 times in the past by other untrained field engineers and 80% of the configurations were successful at the first attempts, and 15% of the configurations were successful at second attempts, and 5% of the configurations were successful at third attempts.

The user may enter, via the user interface, a device management request (e.g., a device configuration request) for managing (e.g., configuring) the field device. At step 618, upon receipt of the device configuration request, the user device may start guidance for configuring the field device based on the user profile, and the guidance may include multiple configuration menus. For example, the user device may present to the user, via the user interface, suggestions that the user follow steps that will be shown on the display screen.

At step 620, in one or more configuration menus, the user device may provide a list of parameters to be configured for the user to choose from. For example, in a configuration menu, the user device may guide the user to select a temperature sensor type for a temperature sensor of the field device. The user device may provide a list of supported temperature sensor types (e.g., RTD, Thermocouple, Milli Volt, and OHM); indicate, for each of temperature sensor types, how often it was used in the previous configurations by other untrained field engineers (e.g., RTD used in 80% of successful configurations, Thermocouple used in 10% of successful configurations, Milli Volt used in 10% of successful configurations, and OHM used in 0% of successful configurations); and ask the user to choose one of these temperature sensor types. The user may select RTD as the temperature sensor type because RTD was most frequently used in previous successful configurations by untrained field engineers and selection of RTD will likely lead to a successful configuration for an untrained field engineer.

At step 622, the user device may personalize the configuration menus based on the user inputs. For example, based on the user's selection of RTD as the temperature sensor type, the user device may display definitions of RTD and/or other data associated with RTD to educate the user. Alternatively, if the user selects OHM as the temperature sensor type, the user device may display definitions of OHM and/or other data associated with OHM, display differences between OHM and RTD, and/or explain why RTD is a better choice compared to OHM. In some cases, the user profile may show that the user is fluent in Spanish but not in English. Based on the user profile, the user device may show the configuration menu in Spanish instead of English.

At step 624, the user device may predict a next configuration menu based on the user inputs and activities. For example, as previously discussed, the user has chosen RTD as the temperature sensor type of the temperature sensor. The user device may predict that a next configuration menu is to configure the engineering unit (e.g., choosing from different temperature units) for the first temperature sensor.

At step 626, the user device may predict management failures before an actual configuration attempt is executed. For example, the user device may analyze the unsuccessful configurations in the past by other users of same or similar privilege, and determine that one or more incorrect variable values or parameters resulted in the unsuccessful configurations. The user device may compare the current user inputs with the one or more incorrect variable values or parameters that resulted in the unsuccessful configurations, and determine if one or more of the variable values or parameters input by the current user match the one or more incorrect variable values or parameters that resulted in the unsuccessful configurations. When a match is determined, the user device may predict that the management would fail before an actual configuration attempt is executed. The user device may warn the user by presenting to the user a warning message indicating that the user has input improper values.

At step 628, the user device may inform the user that the user neglected to input some variable values or parameters that are required for the configuration. For example, the user may neglect to select the temperature sensor type for another temperature sensor of the field device. In this case, the user device may warn the user that the user did not select a temperature sensor type for another temperature sensor, and recommend the user go back to a previous configuration menu to select a temperature sensor type for another temperature sensor. After the user properly responds to all the configuration menus, the user device may send the configuration data to the field device and instruct the field device to download the configuration data. After the configuration data is downloaded, the configuration is completed.

At step 630, after the configuration is completed, the user device may store, in the cloud storage and/or the local database, all of or part of the user inputs during the configuration, and/or any other data related to the management (e.g., data/time when the configuration is started/completed, information of the user configuring the field device). The stored data associated with the calibration may be retrieved and used as historical data for future guidance of management of field devices.

At step 632, the user device may provide, via the user interface, a snapshot for the user to review the configuration results and/or data associated with the configuration. For example, the snapshot may include a message indicating the configuration is successful, configuration data (e.g., variable values or parameters) used in the configuration, data/time when the configuration is started/completed, information of the user configuring the field device, and/or any other data related to this configuration. After reviewing the snapshot, the user may close the interface of the configuration.

Figure 7:
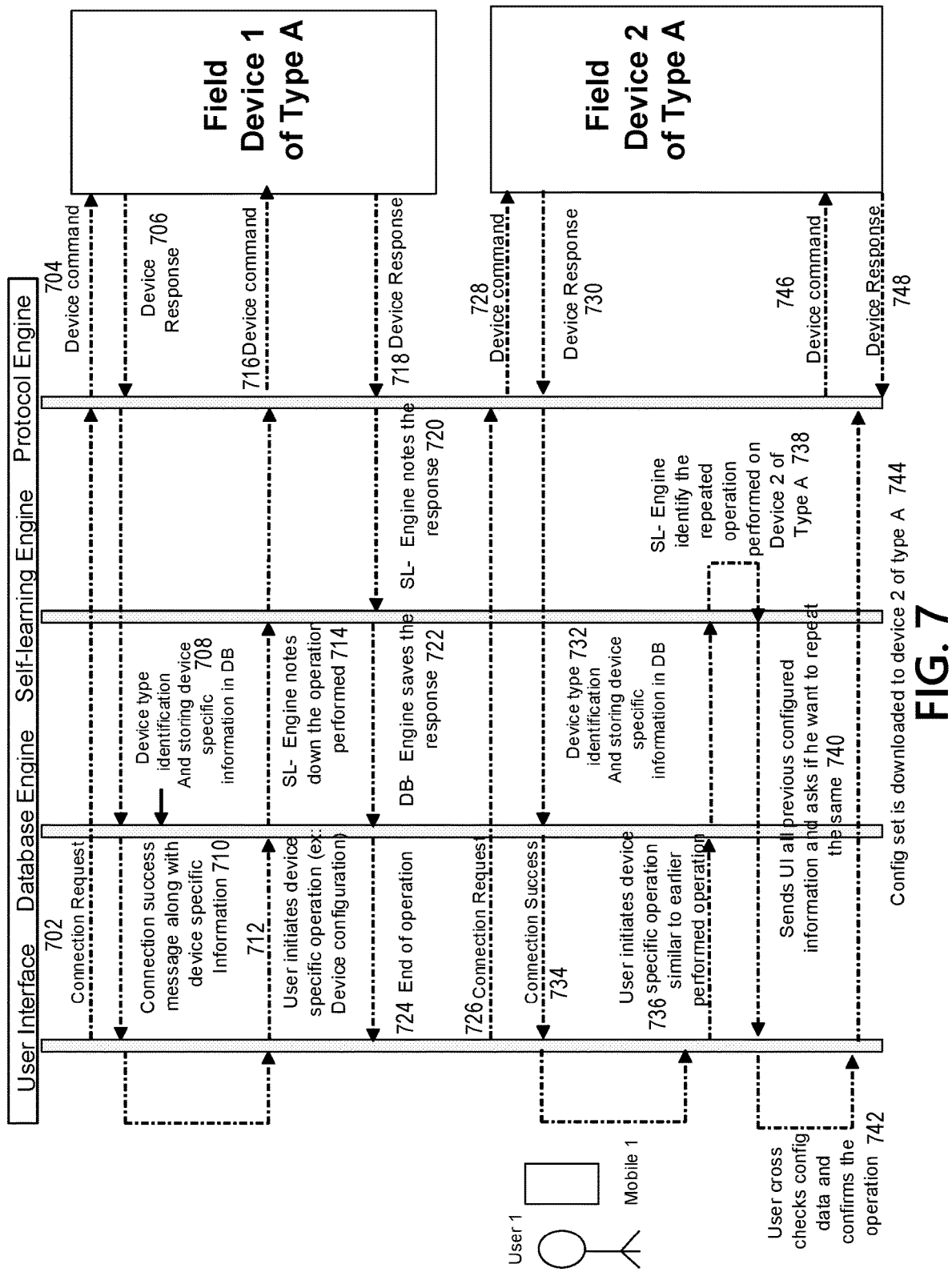
FIG. 7 depicts another example flow sequence for managing a field device using a computing device, on which the interactive profile-based self-learning program module is installed, in accordance with one or more example embodiments.

FIG. 7 depicts another example flow sequence for managing a field device using a computing device, on which the interactive profile-based self-learning program module is installed, in accordance with one or more example embodiments. In the example of FIG. 7, the computing device may guide management of a field device based on device profile.

In FIG. 7, a user device (e.g., a computing device on which the interactive profile-based self-learning program module is installed) may comprise a user interface, a database engine, a self-learning engine, and a protocol engine. The user interface may be similar to the user interface 118, the database engine may be similar to the database 116, the self-learning engine may be similar to the interactive profile-based self-learning program module 104, and the protocol engine may be similar to the protocol program module 114. The user device may be a mobile device (e.g., mobile 1). A user (e.g., user 1) may carry the mobile device to a chemical plant and use the mobile device to manage multiple field devices (e.g., two field devices 1 and 2 of a same type A) associated with the chemical plant.

At step 702, the user interface may receive a connection request to connect to a field device, and the user interface may forward the connection request to the protocol engine. For example, the user may click on a connection bottom shown via the user interface or may log in his user account associated with the self-learning engine. In either case, the user interface receives a connection request to connect to a field device. The user interface may then forward the connection request to the protocol engine.

At step 704, the protocol engine may generate, based on the received connection request, a device command that may be received by a field device via a communication protocol and that may be processed by the field device; and the protocol engine may send the device command to the field device. The protocol engine may direct and/or cause the user device to support one or more communication protocols such that the user device may establish communications with an available field device. In this example, a field device 1 is available to connect to the user device and may receive the device command. The field device 1 may process the device command and connect to the user device using the communication protocol. The field device 1 may be a field device of type A.

At step 706, the field device 1 may send a device response indicating that the field device 1 is connected to the user device. The field device 1 may send the device profile (e.g., the device type identification) of the field device 1 to the protocol engine. The protocol engine may receive the device response and be informed that the field device 1 is connected to the user device. The protocol engine may receive the device profile of the field device 1 from the field device 1. The protocol engine may generate, based on the device response, a connection success message indicating the successful connection between the field device 1 and the user device.

At step 708, the protocol engine may forward the connection success message and the device profile of the field device 1 to the database engine. The database engine may store the device profile of the field device 1. In some cases, the device profile may be stored in the cloud storage. The database engine may record an event that the field device 1 is successfully connected to the user device.

At step 710, the database engine may forward the connection success message and the device profile of the field device 1 to the user interface. The user interface may receive the device profile and the connection success message indicating the successful connection. The user interface may display the connection success message and the corresponding text and/or graphical indications of the device profile of the field device 1.

At step 712, the user may input, via the user interface, a management request for managing the field device 1. For example, the user may enter a device configuration request to configure the field device 1. The user interface may forward the device configuration request to the database engine. The database engine may record an event that a device configuration request was made to configure the field device 1.

At step 714, the database engine may forward the device configuration request to the self-learning engine. The self-learning engine may perform interactive profile-based self-learning algorithms. In this example, the user device may determine that a field device of type A has never been configured. The user device may retrieve, from the cloud storage and/or a local database, pre-stored default operational steps (e.g., recommended by the manufacturer of field devices of type A) associated with the device profile of the field device 1, and display the default operational steps to guide the user to configure the field device 1. The operational steps may comprise selecting and/or entering one or more of sensor types, control mode, engineering units for variables, or the like. The user device may generate inquiries prompting for input of variable values (and/or ranges of variables), and/or generate, based on pre-stored default variable values (and/or ranges of variables), options and/or recommendations for the user to determine variable values (and/or ranges of variables).

At step 716, the user device may determine that sufficient configuration data has been collected, and may send a device command (e.g., a configuration command) along with the configuration data to the field device 1 by using the communication protocol. The field device 1 may receive the configuration command and the configuration data, and may execute the device management command. At step 718, after the configuration is completed, the field device 1 may send, using the communication protocol, a device response indicating that the configuration of the field device 1 is successfully completed.

At step 720, the self-learning engine may receive the device response and record an event that the field device 1 is successfully configured. At step 722, the self-learning engine may forward the device response to the database engine. The database engine may store all of or part of the user inputs during the configuration, and/or any other data related to the management (e.g., data/time when the configuration is started/completed, information of the user configuring the field device). In some cases, the above indicated data associated with the management may be stored in the cloud storage. The stored data associated with the management may be retrieved and used as historical data for future guidance of management of field devices.

At step 724, the database engine may send, to the user interface, data indicating that the management has been completed to the user interface, and/or data associated with the management. The user interface may display a snapshot for user to review. The snapshot may include a message indicating the configuration is successful, configuration data (e.g., variable values or parameters) used in the configuration, data/time when the configuration is started/completed, information of the user configuring the field device, and/or any other data related to this configuration.

After the field device 1 is successfully configured, the user interface may receive another connection request to connect to another field device. For example, the user may enter a request for connecting to another field device of the same type A. As another example, the user device may automatically, without requiring inputs from the user, search for another field device of the same type A. Still as another example, the user device may provide a list of available field devices (e.g., field devices that are within the communication range of the user device and are connectable to the user device) for the user to choose from, and the user chooses to connect to a field device 2 of type A from the list. Same as the field device 1, the field device 2 is a field device of type A. In any of the above cases, the user interface may forward the connection request to the protocol engine.

Similar to step 704, at step 728, the field device 2 may connect to the user device. Similar to step 706, at step 730, the field device 2 may send a device response indicating that the field device 2 is connected to the user device. The field device 2 may send the device profile (e.g., device type identification) of the field device 2 to the protocol engine. The protocol engine may receive the device response and be informed that the field device 2 is connected to the user device. The protocol engine may receive the device profile of the field device 2 from the field device 2. The protocol engine may generate, based on the device response, a connection success message indicating the successful connection between the field device 2 and the user device. Similar to step 708, at step 732, the protocol engine may forward the connection success message and the device profile of the field device 2 to the database engine. The database engine may store the device profile of the field device 2. In some cases, the device profile may be stored in the cloud storage. The database engine may record an event that the field device 2 is successfully connected to the user device. Similar to step 710, at step 734, the database engine may forward the connection success message and the device profile of the field device 2 to the user interface. The user interface may receive the device profile and the connection success message indicating the successful connection. The user interface may display the connection success message and the corresponding text and/or graphical indications of the device profile of the field device 2. Similar to step 712, at step 736, the user may input, via the user interface, a device configuration request for configuring the field device 2. The user interface may forward the request to the database engine. The database engine may record an event that a device configuration request was made to configure the field device 2.

At step 738, the database engine may forward the device configuration request to the self-learning engine. The self-learning engine may compare the device type (type A) of the field device 2 with data stored in the cloud storage and/or a local database, and determine that the device type of the field device 2 matches the device type (type A) of the field device 1 that was previously configured.

At step 740, the self-learning engine may retrieve configuration data (e.g., values of device variables used for configuration) associated with the field device 1 from the cloud storage and/or a local database. The self-learning engine may send, to the user interface, the previous configuration data associated with the field device 1, and ask the user if the user wants to repeat a same configuration process on the field device 2 by using the configuration data associated with the field device 1.

At step 742, the user may review, via the user interface, the configuration data associated with the field device 1, and confirm that the user wants to repeat a same configuration process on the field device 2 by using the configuration data associated with the field device 1. In some cases, the user may update, via the user device, part of or all of values of device variables if the user considers that such update is desirable.

At step 744, the user device may determine that configuration data is ready for the field device 2 to download. Similar to step 716, at step 746, the protocol engine may send a configuration command along with the configuration data to the field device 2. Similar to step 718, at step 748, after the configuration is completed, the field device 2 may send a device response indicating that the configuration of the field device 2 is successfully completed.

Figure 8:
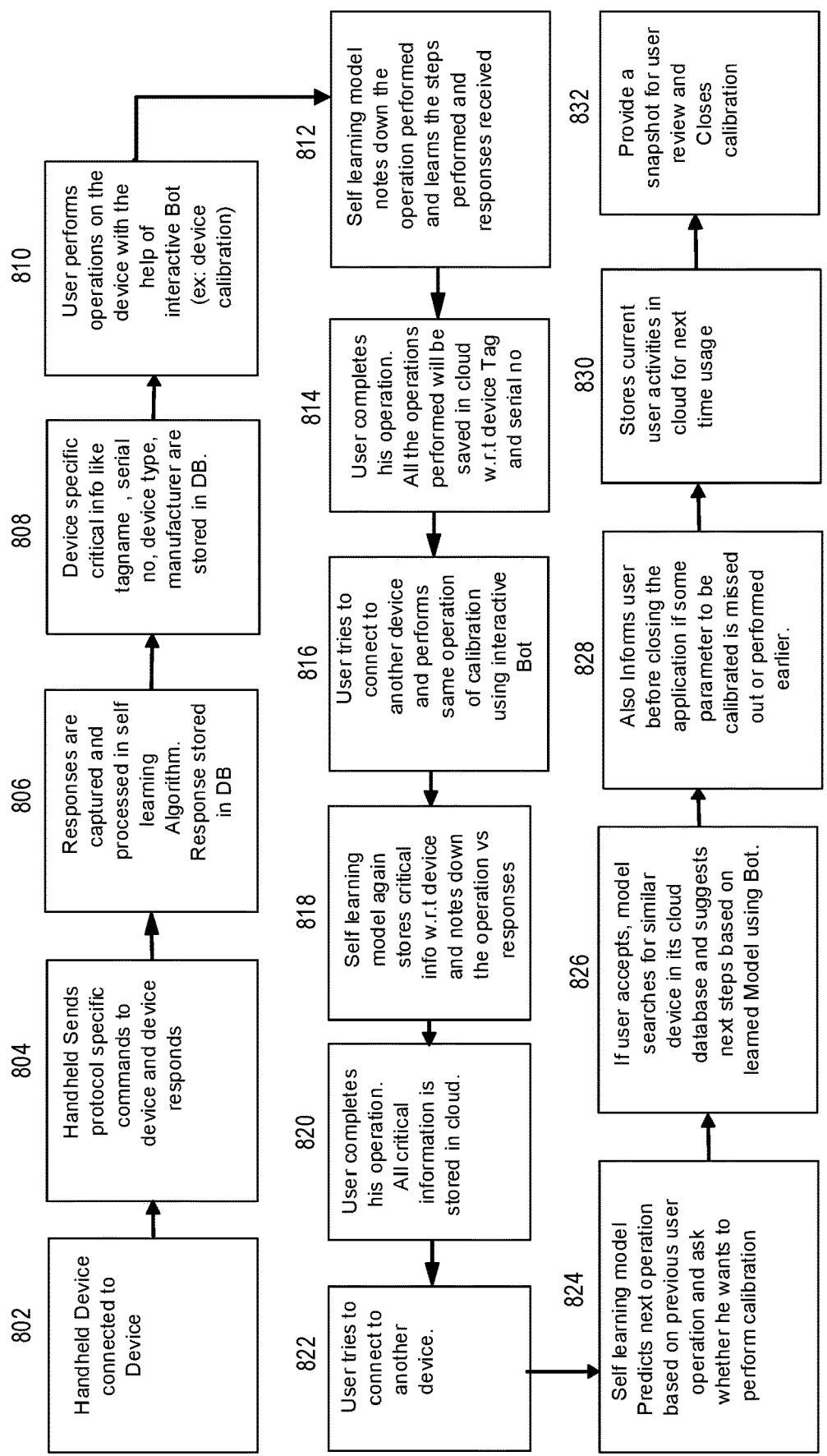
FIG. 8 depicts still another example flow sequence for managing a field device using a computing device, on which the interactive profile-based self-learning program module is installed, in accordance with one or more example embodiments.

FIG. 8 depicts still another example flow sequence for managing a field device using a computing device, on which the interactive profile-based self-learning program module is installed, in accordance with one or more example embodiments. In the example of FIG. 8, the computing device may guide management of a field device based on operation profile.

At step 802, a user device (e.g., a computing device, on which the interactive profile-based self-learning program module is installed) receives a connection request (e.g., triggered by a user logging in his user account) from the user to connect to a field device. The user device may be a handheld device. The user device may receive a user profile included in the user account. At step 804, the user device may send a device command that may be received by a field device via a communication protocol and that may be processed by the field device. The user device may send the device command to a first field device. The first field device may process the device command and connect to the user device using the communication protocol. After the first field device is connected to the user device, the first field device may send a device response indicating that the first field device is connected to the user device. The first field device may send the device profile (e.g., device tagname, device serial number, device type identification, manufacturer of the field device) of the first field device to the user device.

At step 806, the user device may receive the device response indicating the first field device is connected to the user device. The cloud storage and/or a local database may store an event that the first field device is connected to the user device. This stored information is ready for the user device to utilize in the interactive profile-based self-learning algorithms when the user device guides management of the first field device.

At step 808, the device profile of the first field device may be stored in the cloud storage and/or a local database, and is ready for the user device to utilize in the interactive profile-based self-learning algorithms when the user device guides management of the first field device.

At step 810, the user device may receive a management request from the user to manage (e.g., calibrate) the first field device. The user device may use the interactive profile-based self-learning algorithms to guide calibration of the first field device. If calibration of the first field device is successfully completed, the first field device may send a device response indicating that the calibration is successfully completed. Otherwise, the first field device may send a device response indicating that calibration fails. In this example, calibration of the first field device is successful.

At step 812, the self-learning engine of the user device may note down the device management type (e.g., calibration) of the first field device, the steps taken in the calibration, the variable values used in the calibration, the device profile (e.g., device tagname, device serial number) of the first field device, the user profile of the user performing the calibration, whether the calibration is successful, and/or any other data associated with the calibration of the first field device. At step 814, the cloud storage and/or a local database may store data associated with calibration of the first field device.

At step 816, the user device may receive a connection request from the user and connect to a second field device. The second field device may be same or different type compared to the first field device. The user device may receive a device management request (e.g., a device calibration request) from the user to manage (e.g., calibrate) the second field device. Similar to calibration of the first field device, the user device may use the interactive profile-based self-learning algorithms to guide calibration of the second field device. If calibration of the second field device is successfully completed, the second field device may send a device response indicating that the calibration is successfully completed. Otherwise, the second field device may send a device response indicating that calibration fails. In this example, calibration of the second field device is successful.

At step 818, the self-learning engine of the user device may note down data associated with calibration of the second field device. At step 820, the cloud storage and/or a local database may store data associated with calibration of the second field device. Up until now, the self-learning engine learns that the user has performed two calibrations in a row on two field devices.

At step 822, the user device receives a connection request from the user and connect to a third field device. The third field device may be same type or different type compared to the first and second field devices. At step 824, the self-learning engine of the user device may predict, based on the stored data associated with the previous two calibrations in a row on two field devices, that the user may want to continue to perform calibration on the third field device. The self-learning engine may send data indicating such a prediction to the user interface of the user device. The user interface may display indication of such a prediction and ask the user if the user wants to continue to perform calibration on the third field device.

At step 826, the user may confirm, via the user interface, that the user wants to continue to perform calibration on the third field device. The self-learning engine may search the cloud storage and/or a local database and determine whether a field device of the same type of the third field device was previously calibrated. If a field device of the same type was previously calibrated, the self-learning engine may retrieve, from the cloud storage and/or a local databased, data associated with calibration of the field device that was previously calibrated, and guide calibration of the third field device based on the data associated with calibration of the field device that was previously calibrated.

At step 828, the user device may inform the user that the user neglected to input some variable values or parameters. The user device may recommend the user go back to a previous configuration menu to enter the omitted variable values or parameters. After the user properly responds to all the configuration menus, the user device may send the calibration data to the third field device and instruct the third field device to calibrate.

At step 830, after the calibration is completed, the cloud storage and/or the local database may store all of or part of the user inputs during the calibration, and/or any other data associated with the calibration. The stored data associated with the calibration may be retrieved and used as historical data for future guidance of management of field devices.

At step 832, the user device may provide, via the interactive user interface, a snapshot for user to review. The snapshot may include a message indicating the calibration is successful, and/or any data associated with the calibration. After reviewing the snapshot, the user may close the interface of the calibration.

As discussed above, with the interactive profile-based self-learning program module, the user device may automatically identify the field devices, automatically, or in response to a user's request for assistance, provide management recommendations based on one or more of the device profile, user profile, operation profile, or other profiles associated with management of a field device, and automatically predict user's input errors before an actual management attempt is executed. With the interactive profile-based self-learning program module, the user device does not need to launch and use different program modules to manage different types of field devices, respectively, and does not need to repeat management operations due to user's input errors. As such, with the interactive profile-based self-learning program module, the computing storage space allocated for storing different program modules may be saved, computing resource allocated for executing multiple different program modules may be saved, and computing resource allocated for repeating management operations due to user's input errors may be saved.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory storage medium or non-volatile memory.

As described herein, the various methods and acts may be operative across one or more computing structures, e.g., computing devices, computing components, or networks. Computing structures and/or functionality discussed above as separate components in illustrative examples may be combined as a single component. Any and/or all of the above-discussed communications between separate components may be implemented as data being accessed, moved, modified, updated, and/or otherwise used by a single component. Similarly, computing structures and/or functionality discussed above as a single component may be implemented as separate structures or components. Any and/or all of the above-discussed data being accessed, moved, modified, updated, and/or otherwise used by a single component may be implemented as communications between separate components.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    connecting, by a computing device to a database of device profiles and using a communication protocol, to a field device;
    identifying, by the computing device using the database a device profile including at least one of device type or model of the field device, wherein identifying the device profile of the field device comprises:
        comparing the identified device profile with one or more known device profiles pre-stored in the database,
        determining a match including commands and display formats between the identified device profile with the one or more new known device profiles, and
        updating the database based on the one or more new known device profiles;
    determining, a recommendation associated with management of the field device based on one or more of the device profile of the field device, a user profile of a user of the computing device, or a management history associated with one or more of the field device or the user;

receiving, by a user interface, a user input corresponding to the recommendation, wherein the recommendation includes at least one of calibration of the field device, configuring the field device, and instructions that correct the recommendation to the user interface for the user input; and sending, based on the user input, a device management command to manage the connected field device.

2. The method of claim 1, wherein the determining the recommendation associated with the management of the field device comprises:

determining whether the connected field device is associated with a device that has been previously managed.

3. The method of claim 2, wherein the determining the recommendation associated with the management of the field device comprises:

based on determining that the connected field device is associated with the device that has been previously managed, receiving data indicating how the device that has been previously managed was managed in history by the user or another user with a same privilege as the user; and determining, based on the received data indicating how the device that has been previously managed was managed in history by the user or the another user with the same privilege as the user, the recommendation associated with management of the field device.

4. The method of claim 2, wherein the determining the recommendation associated with the management of the field device comprises:

based on determining that the connected field device is associated with the device that has been previously managed, receiving data indicating one or more operational steps or variable values used for management of the device that has been previously managed; and determining, based on the received data indicating the one or more operational steps or variable values used for the management of the device that has been previously managed, the recommendation associated with management of the field device.

5. The method of claim 2, wherein the determining the recommendation associated with the management of the field device comprises:

based on determining that the connected field device is not associated with the device that has been previously managed, receiving data indicating one or more pre-stored default operational steps or pre-stored default variable values associated with the connected field device; and determining, based on the received data indicating the one or more pre-stored default operational steps or the pre-stored default variable values associated with the connected field device, the recommendation associated with management of the field device.

6. The method of claim 1, wherein the determining the recommendation associated with the management of the field device comprises:

receiving data indicating management types of the management operations the user has performed; and determining, based on the received data indicating the management types of the management operations the user has performed, the recommendation associated with management of the field device.

7. An apparatus, comprising:

at least one processor; and memory storing computer-readable instructions that, when executed by the at least one processor, cause the apparatus to:

connect, by a computing device to a database of device profiles and using a communication protocol, to a field device;

identify, by the computing device using the database a device profile including at least one of device type or model of the field device, wherein the identification of the device profile of the field device comprises:

comparing the identified device profile with one or more known device profiles pre-stored in the database;

determining a match including commands and display formats between the identified device profile with the one or more new known device profiles, and updating the database based on the one or more new known device profiles;

determine, a recommendation associated with management of the field device based on one or more of the device profile of the field device, a user profile of a user of the apparatus, or a management history associated with one or more of the field device or the user;

receive, by a user interface, user inputs corresponding to the recommendation, wherein the recommendation includes at least one of calibration of the field device, configuring the field device, and instructions that correct the recommendation to the user interface for the user input; and send, based on the user inputs, a device management command to manage the connected field device.

8. The apparatus of claim 7, wherein the computer-readable instructions, when executed, cause the apparatus to:

determine whether the connected field device is associated with a device that has been previously managed.

9. The apparatus of claim 8, wherein the computer-readable instructions, when executed, cause the apparatus to:

based on determining that the connected field device is associated with the device that has been previously managed, receiving data indicating how the device that has been previously managed was managed in history by the user or another user with a same privilege as the user; and determine, based on the received data indicating how the device that has been previously managed was managed in history by the user or another user with the same privilege as the user, the recommendation associated with management of the field device.

10. The apparatus of claim 8, wherein the computer-readable instructions, when executed, cause the apparatus to:

based on determining that the connected field device is associated with the device that has been previously managed, receiving data indicating one or more operational steps or variable values used for management of the device that has been previously managed; and determine, based on the received data indicating the one or more operational steps or variable values used for management of the device that has been previously managed, the recommendation associated with management of the field device.

11. The apparatus of claim 8, wherein the computer-readable instructions, when executed, cause the apparatus to:

based on determining that the connected field device is not associated with a device that has been previously managed, receive data indicating one or more pre-stored default operational steps or pre-stored default variable values associated with the connected field device; and determine, based on the received data indicating the one or more pre-stored default operational steps or pre-stored default variable values associated with the connected field device, the recommendation associated with management of the field device.

12. The apparatus of claim 7, wherein the computer-readable instructions, when executed, cause the apparatus to:

receive data indicating management types of the management operations the user has performed; and determine, based on the received data indicating the management types of the management operations the user has performed, the recommendation associated with management of the field device.

13. The apparatus of claim 7, wherein the device management command comprises one or more of a device configuration command, a device calibration command, a device diagnostics command, or a device monitoring command.

14. One or more non-transitory computer-readable media storing instructions that, when executed, cause a system to:

connect, by a computing device to a database of device profiles and using a communication protocol, to a field device;

identify, by the computing device using the database a device profile including at least one of device type or model of the field device, wherein the identification of the device profile of the field device comprises:

compare the identified device profile with one or more known device profiles pre-stored in the database;

determine a match including commands and display formats between the identified device profile with the one or more new known device profiles, and update the database based on the one or more new known device profiles;

determine, a recommendation associated with management of the field device based on one or more of the device profile of the field device, a user profile of a user of the system, or a management history associated with one or more of the field device or the user;

receive, by a user interface, user inputs corresponding to the recommendation, wherein the recommendation includes at least one of calibration of the field device, configuring the field device, and instructions that correct the recommendation to the user interface for the user input; and send, based on the user inputs, a device management command to manage the connected field device.

15. The one or more non-transitory computer-readable media of claim 14, wherein the instructions, when executed, further cause the system to:

determine whether the connected field device is associated with a device that has been previously managed.

16. The one or more non-transitory computer-readable media of claim 15, wherein the instructions, when executed, further cause the system to:

based on determining that the connected field device is associated with the device that has been previously managed, receive data indicating how the device that has been previously managed was managed in history by the user or another user with a same privilege as the user; and determine, based on the received data indicating how the device that has been previously managed was managed in history by the user or another user with the same privilege as the user, the recommendation associated with management of the field device.

17. The one or more non-transitory computer-readable media of claim 15, wherein the instructions, when executed, further cause the system to:

based on determining that the connected field device is associated with the device that has been previously managed, receive data indicating one or more operational steps or variable values used for management of the device that has been previously managed; and determine, based on the received data indicating the one or more operational steps or variable values used for management of the device that has been previously managed, the recommendation associated with management of the field device.

18. The one or more non-transitory computer-readable media of claim 15, wherein the instructions, when executed, further cause the system to:

based on determining that the connected field device is not associated with the device that has been previously managed, receive data indicating one or more pre-stored default operational steps or pre-stored default variable values associated with the connected field device; and determine, based on the received data indicating the one or more pre-stored default operational steps or pre-stored default variable values associated with the connected field device, the recommendation associated with management of the field device.

19. The one or more non-transitory computer-readable media of claim 14, wherein the instructions, when executed, further cause the system to:

receive data indicating management types of the management operations the user has performed; and determine, based on the received data indicating the management types of the management operations the user has performed, the recommendation associated with management of the field device.

* * * * *